US012756927B2

(12) United States Patent
Varna et al.

(10) Patent No.: US 12,756,927 B2
(45) Date of Patent: Oct. 6, 2026

(54) METHODS AND SYSTEMS FOR ENHANCING LOW LIGHT FRAME IN A MULTI CAMERA SYSTEM

(71) Applicant: SAMSUNG ELECTRONICS CO., LTD., Suwon-si (KR)

(72) Inventors: Rahul Varna, Bangalore (IN); Akshit Agarwal, Bangalore (IN); Ankur Mani Tripathi, Bangalore (IN); Anunay Srivastava, Bangalore (IN); Shivam Arora, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 18/945,047

(22) Filed: Nov. 12, 2024

(65) Prior Publication Data

US 2025/0071412 A1 Feb. 27, 2025

Related U.S. Application Data

(63) Continuation of application No. PCT/KR2023/006495, filed on May 12, 2023.

(30) Foreign Application Priority Data

May 12, 2022 (IN) ............................ 202241027504
Feb. 16, 2023 (IN) ............................ 202241027504

(51) Int. Cl.
*H04N 23/60* (2023.01)
*H04N 23/45* (2023.01)
(Continued)

(52) U.S. Cl.
CPC ............ *H04N 23/64* (2023.01); *H04N 23/45* (2023.01); *H04N 23/667* (2023.01);
(Continued)

(58) Field of Classification Search
CPC ...... H04N 23/64; H04N 23/45; H04N 23/667; H04N 23/71; H04N 23/73; H04N 23/81;
(Continued)

(56) References Cited

U.S. PATENT DOCUMENTS

| | | | |
|---|---|---|---|
| 8,339,475 | B2 | 12/2012 | Atanassov et al. |
| 11,102,421 | B1 | 8/2021 | Seely et al. |

(Continued)

FOREIGN PATENT DOCUMENTS

| | | | |
|---|---|---|---|
| CN | 107770438 | A | 3/2018 |
| EP | 3 151 539 | A1 | 4/2017 |
| KR | 10-2016-0031706 | A | 3/2016 |

OTHER PUBLICATIONS

Communication dated Jul. 14, 2025, issued by European Patent Office in European Patent Application No. 23803889.7.

(Continued)

*Primary Examiner* — Jason A Flohre
(74) *Attorney, Agent, or Firm* — Sughrue Mion, PLLC

(57) ABSTRACT

Provided is a system and method for enhancing media. The method includes: identifying whether a scene of a first preview frame captured by at least one primary camera was captured in low light based on at least one pre-defined parameter of the first preview frame; based on identifying that the first preview frame was captured in low light, triggering at least one secondary camera to capture a second preview frame of the scene, wherein the second preview frame has an exposure time higher than an exposure time of the first preview frame, and wherein the second preview frame includes one of a higher field of view (FOV) and a same FOV as compared to the first preview frame; and generating an output frame based on the first preview frame, the second preview frame, and at least one of the at least one pre-defined parameter.

20 Claims, 17 Drawing Sheets

(51) Int. Cl.
*H04N 23/667* (2023.01)
*H04N 23/71* (2023.01)
*H04N 23/73* (2023.01)
*H04N 23/81* (2023.01)
*H04N 23/84* (2023.01)

(52) U.S. Cl.
CPC ............. *H04N 23/71* (2023.01); *H04N 23/73* (2023.01); *H04N 23/81* (2023.01); *H04N 23/84* (2023.01)

(58) Field of Classification Search
CPC .... H04N 23/84; H04N 23/617; H04N 23/662; H04N 23/80; H04N 23/90; H04N 25/589; G06T 2207/20081; G06T 2207/20084; G06T 5/40; G06T 5/50; G06T 5/60; G06T 5/90
See application file for complete search history.

(56) References Cited

U.S. PATENT DOCUMENTS

| | | | | |
|---|---|---|---|---|
| 2016/0044252 | A1 | 2/2016 | Molina | |
| 2016/0080653 | A1 | 3/2016 | Kim et al. | |
| 2017/0026594 | A1* | 1/2017 | Shida | H04N 23/741 |
| 2017/0118450 | A1 | 4/2017 | Jung et al. | |
| 2017/0142312 | A1 | 5/2017 | Dal Mutto et al. | |
| 2017/0201692 | A1 | 7/2017 | Wu | |
| 2018/0035058 | A1* | 2/2018 | Thumpudi | G06T 5/73 |
| 2019/0379812 | A1 | 12/2019 | Suman et al. | |
| 2020/0134848 | A1* | 4/2020 | El-Khamy | H04N 23/45 |
| 2020/0358963 | A1* | 11/2020 | Manzari | H04N 23/633 |
| 2021/0112188 | A1 | 4/2021 | Gao et al. | |
| 2021/0274151 | A1 | 9/2021 | Xue et al. | |
| 2021/0377457 | A1 | 12/2021 | Kobayashi | |
| 2021/0392312 | A1* | 12/2021 | Bleyer | H04N 13/111 |
| 2022/0053142 | A1 | 2/2022 | Manzari et al. | |
| 2022/0294992 | A1* | 9/2022 | Manzari | H04N 23/632 |
| 2023/0342894 | A1* | 10/2023 | Scharfenberger | H04N 5/2624 |

OTHER PUBLICATIONS

Office Action issued on Feb. 28, 2025 by the Indian Patent Office in corresponding IN Patent Application No. 202241027504.
International Search Report (PCT/ISA/210) issued Aug. 4, 2023 by the International Searching Authority in International Application No. PCT/KR2023/006495.
Written Opinion (PCT/ISA/237) issued Aug. 4, 2023 by the International Searching Authority in International Application No. PCT/KR2023/006495.
Communication issued on Jan. 22, 2026 by the Intellectual Property India in Indian Patent Application No. 202241027504.

* cited by examiner

Proposed Solution - With pixel-wise average blending

Proposed Solution - Without pixel-wise average blending

Photo mode output

METHODS AND SYSTEMS FOR ENHANCING LOW LIGHT FRAME IN A MULTI CAMERA SYSTEM

This application is a by-pass continuation of International Application No. PCT/KR2023/006495, filed on May 12, 2023, which is based on and claims priority to Indian Patent Application No. 202241027504, filed on May 12, 2022, and Indian Patent Application No. 202241027504, filed Feb. 16, 2023, the disclosures of which are incorporated by reference herein in their entireties.

BACKGROUND

1. Field

The disclosure relates to enhancing low light scenes in a multi camera system, and more particularly, to providing media with accurate details using artificial intelligence (AI), based on at least one pre-defined parameter.

2. Description of Related Art

An exposure time of an image sensor can be a duration of time during which light is sampled by individual pixels in the image sensor. Under low light conditions, the usage of a longer exposure time can provide a brighter image but results in motion blur in which moving objects in the scene are blurred because of movement over the time associated with the sampling of the light. Under low light conditions, the usage of a shorter exposure time can result in noise, whereby details present in a scene being captured may be lost/reduced.

Image capturing scenarios which may employ fusion operations such as the image captured while stationary may exhibit a minimum threshold amount of motion over a predetermined time interval. In low-light conditions, it may be difficult to perform operations on the captured images, due to low signal-to-noise ratio (SNR). Also, fusing multiple images of the same captured scene helps in achieving increased SNR in a resulting fused image compared to SNR on individual images contributing to the fusion operations.

In existing mechanisms, simulating long exposure image capture with the fusion of multiple individual images captured during a time interval may result in the capture of a larger number of images than the capturing device can hold in memory at one time, which may provide additional challenges in memory-limited devices, for instance, mobile, electronic devices, image capturing devices and the like.

In conventional systems, image capturing devices in electronic devices can capture images with under-exposed or over-exposed regions while capturing images of natural scenes. This may be because image sensors on the electronic device have a limited dynamic range which may capture multiple images of the frame and combine the parts of the image frames to produce blended image. However, producing a blended image from a set of image frames with different exposures is challenging for dynamic scenes. However, cameras on electronic devices may have poor performance in low-light situations. Also, increasing the amount of light collected at an image sensor by increasing the exposure time may increase the risk of producing blurred images due to object and camera motion.

SUMMARY

Provided are methods and systems for enhancing low light frames in a multi camera system.

Further provided are methods and systems for enhancing low light scene by obtaining frames at different exposure settings and combine the output to obtain a bright (properly exposed), and less noisy image.

Further provided are methods and systems for providing efficient low light enhancement by performing accurate color reproduction of the objects in low light.

Further provided are methods and systems for providing higher field of view (FOV) with the exposed camera frame with less noise.

According to an aspect of the disclosure a method for enhancing media includes: identifying whether a scene of a first preview frame captured by at least one primary camera was captured in low light based on at least one pre-defined parameter of the first preview frame; based on identifying that the first preview frame was captured in low light, triggering at least one secondary camera to capture a second preview frame of the scene, wherein the second preview frame has an exposure time higher than an exposure time of the first preview frame, and wherein the second preview frame includes one of a higher field of view (FOV) and a same FOV as compared to the first preview frame; and generating an output frame based on the first preview frame, the second preview frame, and at least one of the at least one pre-defined parameter.

The at least one pre-defined parameter may include one or more of a luminance value, an International Standard for Organization (ISO) value, and an exposure gain of the first preview frame.

The generating the output frame may include comparing a first histogram of the first preview frame and a second histogram of the second preview frame, wherein the first and the second histograms correspond to at least one of the at least one pre-defined parameter.

The method may further include: based on identifying that the first preview frame does not fall within a predetermined range of at least one of the at least one pre-defined parameter, triggering the at least one secondary camera to capture the second preview frame.

The may further include: based on a user selecting a specific acquisition mode to capture the scene, triggering the at least one secondary camera to capture the second preview frame.

The generating the output frame may further include: performing a histogram equalization wherein the first preview frame and the second preview frame are combined using an artificial intelligence (AI) module to accurately reproduce a color of an object in the scene, and enhancing a brightness and reducing a noise of a region of the object in the scene using the AI module.

The triggering the at least one secondary camera may further include one of: capturing at least one region of an object in the scene with the higher FOV; and capturing at least one region of the object with the same FOV.

According to an aspect of the disclosure, an electronic device for enhancing media includes: at least one primary camera; at least one secondary camera; at least one memory storing one or more instructions; and at least one processor configured to execute the one or more instructions; wherein the one or more instructions, when executed by the at least one processor, cause the electronic device to: identify whether a scene of a first preview frame captured by the at least one primary camera was captured in low light based on at least one pre-defined parameter of the first preview frame, based on identifying that the first preview frame was captured in low light, trigger the at least one secondary camera to capture a second preview frame, wherein the second preview frame has an exposure time higher than an exposure time of the first preview frame, and wherein the second preview frame includes one of a higher field of view (FOV) and a same FOV as compared to the first preview frame; and generate an output frame based on the first preview frame, the second preview frame, and at least one of the at least one pre-defined parameter.

The at least one pre-defined parameter may include one or more of a luminance value, an International Standard for Organization (ISO) value, and an exposure gain of the first preview frame.

The one or more instructions, when executed by the at least one processor, may further cause the electronic device to: generate the output frame by comparing a first histogram of the first preview frame and a second histogram of the second preview frame, wherein the first and the second histograms correspond to at least one of the at least one pre-defined parameter.

The one or more instructions, when executed by the at least one processor, may further cause the electronic device to: based on identifying that the first preview frame does not fall within a predetermined range of at least one of the at least one pre-defined parameter, trigger the at least one secondary camera to capture the second preview frame, and based on a user selecting a specific acquisition mode to capture the scene, trigger the at least one secondary camera to capture the second preview frame.

The one or more instructions, when executed by the at least one processor, may further cause the electronic device to: generate the output frame by performing a histogram equalization wherein the first preview frame and the second preview frame are combined using an artificial intelligence (AI) module to accurately reproduce a color of an object in the scene, and enhance a brightness and reduce a noise of a region of the object in the scene using the AI module.

The one or more instructions, when executed by the at least one processor, may further cause the electronic device to: trigger the at least one secondary camera to capture at least one region of an object in the scene with the higher FOV, or capture the at least one region of the object with the same FOV.

According to an aspect of the disclosure, a non-transitory computer readable medium having instructions stored therein, which when executed by at least one processor, cause the at least one processor to execute a method of enhancing media, the method including: identifying whether a scene of a first preview frame captured by at least one primary camera was captured in low light based on at least one pre-defined parameter of the first preview frame; based on identifying that the first preview frame was captured in low light, triggering at least one secondary camera to capture a second preview frame of the scene, wherein the second preview frame has an exposure time higher than an exposure time of the first preview frame, and wherein the second preview frame includes one of a higher field of view (FOV) and a same FOV as compared to the first preview frame; and generating an output frame based on the first preview frame, the second preview frame, and at least one of the at least one pre-defined parameter.

With regard to the method executed based on the instructions stored in the non-transitory computer readable medium, the at least one pre-defined parameter may include one or more of a luminance value, an International Standard for Organization (ISO) value, and an exposure gain of the first preview frame.

With regard to the method executed based on the instructions stored in the non-transitory computer readable medium, the generating the output frame may include comparing a first histogram of the first preview frame and a second histogram of the second preview frame, wherein the first and the second histograms correspond to at least one of the at least one pre-defined parameter.

With regard to the method executed based on the instructions stored in the non-transitory computer readable medium, the method may further include: based on identifying that the first preview frame does not fall within a predetermined range of at least one of the at least one pre-defined parameter, triggering the at least one secondary camera to capture the second preview frame.

With regard to the method executed based on the instructions stored in the non-transitory computer readable medium, the method may further include: based on a user selecting a specific acquisition mode to capture the scene, triggering the at least one secondary camera to capture the second preview frame.

With regard to the method executed based on the instructions stored in the non-transitory computer readable medium, the generating the output frame may further include: performing a histogram equalization wherein the first preview frame and the second preview frame are combined using an artificial intelligence (AI) module to accurately reproduce a color of an object in the scene, and enhancing a brightness and reducing a noise of a region of the object in the scene using the AI module.

With regard to the method executed based on the instructions stored in the non-transitory computer readable medium, the triggering the at least one secondary camera may further include one of: capturing at least one region of an object in the scene with the higher FOV; and capturing at least one region of the object with the same FOV.

These and other aspects of certain embodiments described herein will be better appreciated and understood when considered in conjunction with the following description and the accompanying drawings. It should be understood, however, that the following descriptions, while indicating one or more embodiments and numerous specific details thereof, are given by way of illustration and not of limitation. Many changes and modifications may be made within the scope of the embodiments herein without departing from the spirit thereof, and the embodiments herein should be understood to include all such modifications.

BRIEF DESCRIPTION OF THE DRAWINGS

The above and other aspects and features of certain embodiments of the present disclosure will be more apparent from the following description taken in conjunction with the accompanying drawings, in which.

DETAILED DISCLOSURE

Figure 1:
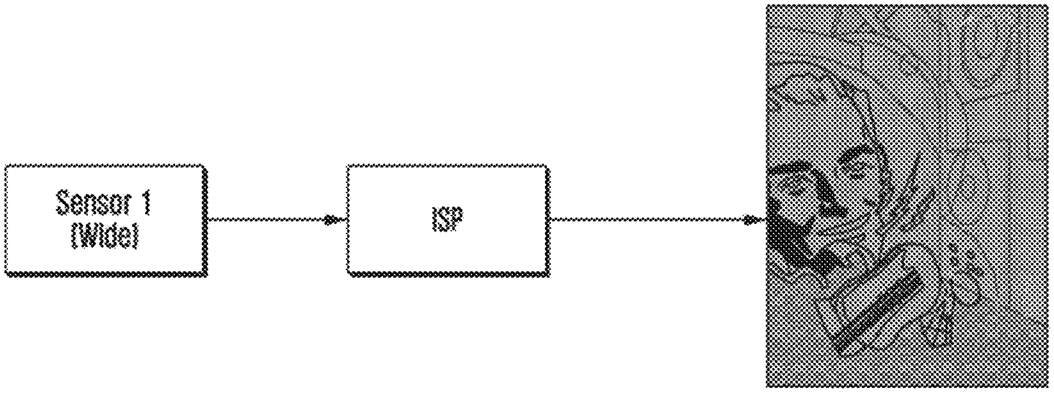
FIG. 1 illustrates an example scenario, wherein a comparative electronic device using an image signal processor (ISP) captures a low light scene.

The embodiments described herein, and the various features and details thereof, are explained more fully with reference to the non-limiting embodiments that are illustrated in the accompanying drawings and detailed in the following description. Descriptions of well-known components and processing techniques are omitted so as not to unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

In the following description, like reference numerals refer to like elements throughout the specification. Terms such as "unit", "module", "member", and "block" may be embodied as hardware or software. As used herein, a plurality of "units", "modules", "members", and "blocks" may be implemented as a single component, or a single "unit", "module", "member", and "block" may include a plurality of components.

It will be understood that when an element is referred to as being "connected" with or to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

As used herein, the expressions "at least one of a, b or c" and "at least one of a, b and c" indicate "only a," "only b," "only c," "both a and b," "both a and c," "both b and c," and "all of a, b, and c."

It will be understood that, although the terms "first", "second", "third", etc., may be used herein to describe various elements, is the disclosure should not be limited by these terms. These terms are only used to distinguish one element from another element.

As used herein, the singular forms "a," "an" and "the" are intended to include the plural forms as well, unless the context clearly indicates otherwise.

With regard to any method or process described herein, an identification code may be used for the convenience of the description but is not intended to illustrate the order of each step or operation. Each step or operation may be implemented in an order different from the illustrated order unless the context clearly indicates otherwise. One or more steps or operations may be omitted unless the context of the disclosure clearly indicates otherwise.

FIG. 1 illustrates an example scenario, wherein an electronic device using an image signal processor (ISP) captures a low light scene. The ISP referred to herein may be an image processor or an image processing unit, which is a type of media processor used for processing of captured images from a scene. As illustrated in FIG. 1, the sensor of the electronic device which may include but is not limited to wide sensors which are capable of capturing light and converting it into signals which may result in an image. The ISP, on receiving the captured image from the sensor, may perform post-processing on the captured image which may include, but is not limited to, noise reduction, HDR correction, scene recognition, face recognition, capturing a scene multiple times to perform fusion of images and the like.

As illustrated in FIG. 1, the ISP is capable of processing the output signal of the image sensor. For an instance, the electronic device, on capturing a scene using a wide camera sensor in a low light scenario, can perform limited operations to the captured scene through the ISP, which can provide an image with or without any enhancements to the captured image. The enhancements applied by the ISP on the captured image may be unnoticeable or may remain the same as that of captured image in low light conditions.

One or more embodiments herein provide methods and systems for enhancing the captured media in a low light scenario by triggering a secondary camera for higher field of view (FOV) and combining the output frame from the first preview frame and secondary preview frame based on at least one pre-defined parameter.

One or more embodiments herein disclose methods and systems for enhancing a captured frame of a media. One or more embodiments disclose analyzing whether the captured scene with the first preview frame of the primary camera is in low light based on at least one pre-defined parameter of the first preview frame. Further, embodiments herein disclose triggering a secondary camera for the higher field of view (FOV) on determining that the first preview frame is in low light. Further, one or more embodiments herein disclose configuring a secondary camera with a higher exposure time to obtain secondary preview frame. Further, the output frame can be generated by combining the first preview and second preview frame by an AI model based on at least one pre-defined parameter.

Figure 2:
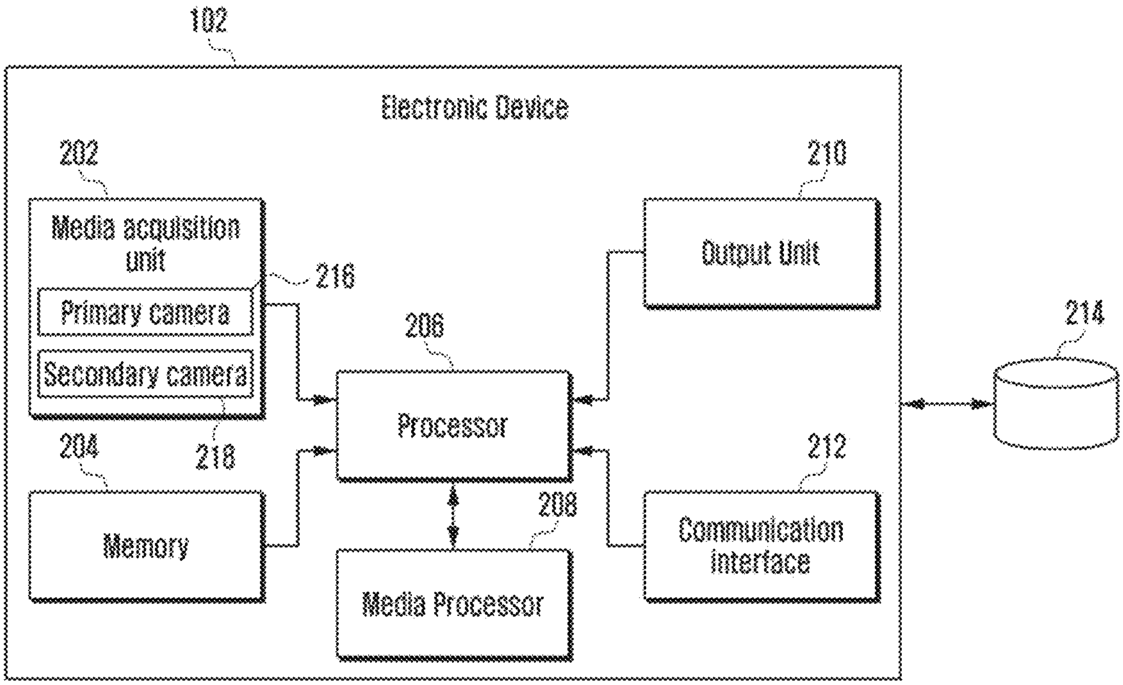
FIG. 2 depicts a block diagram illustrating various components of an electronic device for enhancing the frame of the captured media in an electronic device, according to one or more embodiments of the disclosure.

FIG. 2 depicts a block diagram illustrating various components of an electronic device for enhancing the frame of the captured media in the electronic device, according to one or more embodiments of the disclosure. The electronic device 102 may include a media acquisition unit 202, a memory 204, a processor 206, a media processor 208, an output unit 210, a communication interface 212.

The electronic device 102 referred to herein may be a device that captures the scene using a primary camera of the electronic device 102. The primary camera can be configured to receive a first preview frame of the captured scene/media. The preview frame may include a specific format in which the captured scene/media may be displayed based on a user's requirements. For an instance, the user may request the properties for the preview frame, which may include but are not limited to height, width, resolution, and the like of the captured scene. The primary camera on analyzing the first preview frame of the captured scene may identify whether the captured scene is a low light scene based on at least one pre-defined parameter of the first preview frame.

Examples of the at least one pre-defined parameter of the captured scene may include, but are not limited to, primary camera's/sensor's luminance value, International Organization for Standardization (ISO), exposure gain and the like. The luminance value of the primary camera may refer to an exposure value that measures the luminous intensity per unit area of light travelling in a given direction. The ISO may refer to camera settings which can be used to brighten or darken the scene while capturing the media.

The electronic device 102 on determining that the first preview frame has captured a low light scene, can trigger the secondary camera. In an embodiment herein, the secondary camera can be triggered to capture frames with a larger Field of View (FOV), as compared to the first preview frame. The larger FOV allows the secondary camera to capture more efficient images containing more scenes to capture the entire frame. In an embodiment herein, the secondary camera can be triggered to capture frames with a smaller Field of View (FOV), as compared to the first preview frame. In an embodiment herein, the secondary camera can be triggered to capture frames with the same FOV.

The secondary camera can be configured with a higher exposure time (as compared to the exposure time of the first preview frame) to obtain at least one secondary preview frame of the scene. The secondary preview frame can comprise more details. The electronic device 102 may generate an output frame from the captured first preview frame and secondary preview frame based on at least one pre-defined parameter. The electronic device 102 may provide the output frame by combining the first and second preview frames based on an artificial intelligent (AI) model to enhance the low light frame captured in a media.

The electronic device 102 can be configured with a plurality of cameras, wherein a first camera used to capture the first preview frame is referred to herein as the primary camera and a second camera used to capture the secondary frame is referred to herein as the secondary camera. The electronic device 102 referred to herein may be configured to capture and combine the preview frames to enhance the low light scenes from the media. Examples of the electronic device 102 may be, but are not limited to, a smartphone, a mobile phone, a video phone, a computer, a tablet personal computer (PC), a laptop, a wearable device, a personal digital assistant (PDA), an IoT device, or any other device that may be portable.

As illustrated in FIG. 2, the media acquisition unit 202 referred to herein can be any kind of device used to capture media. The media referred to herein can be, but is not limited to video, images and the like captured using media acquisition unit 202. The media acquisition unit 202 can be configured to capture the media inputs (the video input, the image input, or any media input) from the scene. The media acquisition unit 202 comprises a plurality of cameras, wherein the first camera (also referred to herein as the primary camera) is used to capture the first preview and the second camera (also referred to herein as the secondary camera) is used to capture the secondary frame. The primary camera 216 and secondary camera 218 of the acquisition unit 202 can capture the media inputs from the environment.

The primary camera 216 may include a sensor (i.e., an image sensor), a lens assembly, an actuator and an image signal processor (ISP).

The secondary camera 218 may include a sensor (i.e., an image sensor), a lens assembly, an actuator and an image signal processor (ISP).

The sensor and/or the image sensor may obtain an image corresponding to an object by converting light emitted or reflected from the object and transmitted via the at least one lens into an electrical signal. According to an embodiment, the sensor and/or the image sensor may include one selected from image sensors having different attributes, such as a RGB sensor, a black-and-white (BW) sensor, an IR sensor, or a UV sensor, a plurality of image sensors having the same attribute, or a plurality of image sensors having different attributes. Each sensor included in the image sensor may be implemented using, for example, a charged coupled device (CCD) sensor or a complementary metal oxide semiconductor (CMOS) sensor.

The lens assembly may collect light emitted or reflected from an object whose image is to be taken. The lens assembly may include one or more lenses. According to an embodiment, the camera may include a plurality of lens assemblies. In such a case, the camera may form, for example, a dual camera, a 360-degree camera, or a spherical camera. Some of the plurality of lens assemblies may have the same lens attribute (e.g., view angle, focal length, auto-focusing, f number, or optical zoom), or at least one lens assembly may have one or more lens attributes different from those of another lens assembly. The lens assembly may include, for example, a wide-angle lens, and ultra-wide angle lens or a telephoto lens.

The actuator may move at least one lens included in the lens assembly in a particular direction in response to commands from a camera driver based on an auto focusing algorithm and/or in response to the movement of the camera and the scene being captured. This allows compensating for at least part of a negative effect (e.g., image blurring) by the movement on an image being captured. According to an embodiment, the actuator may be instructed to move the lens based on the values received from gyro sensor or an acceleration sensor disposed inside or outside the camera to correct the focus.

The image signal processor may perform one or more image processing functions with respect to an image obtained via the sensor and/or the image sensor or an image stored in the memory. The one or more image processing functions may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor may perform control (e.g., exposure time control or read-out timing control) with respect to at least one (e.g., the sensor and/or the image sensor) of the components included in the camera. An image processed by the image signal processor may be stored back in the memory for further processing, or may be provided to an external component (e.g., the memory, the display device, the electronic device, or the server) outside the camera. According to an embodiment, the image signal processor may be configured as at least part of the processor, or as a separate processor that is operated independently from the processor. If the image signal processor is configured as a separate processor from the processor, at least one image processed by the image signal processor may be displayed, by the processor, via the display device as it is or after being further processed.

According to an embodiment, the electronic device 102 may include a plurality of cameras (216, 218) having different attributes or functions. In such a case, at least one of the plurality of cameras may form, for example, a wide-angle camera (or, an wide sensor camera) and at least another of the plurality of cameras may form an ultrawide angle camera (or, ultrawide sensor camera). Similarly, at least one of the plurality of cameras may form, for example, a front camera and at least another of the plurality of cameras may form a rear camera. Similarly, at least one of the plurality of cameras may form, for example, a wide-angle camera and at least another of the plurality of cameras may form a telephoto camera.

The communication interface 212 may include one or more components which the electronic device 102 can use to communicate with another device (for example, another electronic device, the cloud server, and so on) using data communication methods that are supported by the communication network. The communication interface 212 may include components such as a wired communicator, a short-range communicator, a mobile/wireless communicator, and a broadcasting receiver. The wired communicator may enable the electronic device 102 to communicate with the other devices (for example, another electronic device, the cloud-based server, the plurality of devices, and so on) using the communication methods such as, but not limited to, wired LAN, the Ethernet, and so on. The short-range communicator may enable the electronic device 102 to communicate with the other devices using the communication methods such as, but is not limited to, Bluetooth low energy (BLE), near field communicator (NFC), WLAN (or Wi-fi), Zigbee, infrared data association (IrDA), Wi-Fi direct (WFD), Ultrawide band communication, Ant+ (interoperable wireless transfer capability) communication, shared wireless access protocol (SWAP), wireless broadband internet (Wibro), wireless gigabit alliance (WiGiG), and so on.

The processor 206 may comprise one or more processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor 206 may be configured to enhance low light frames from a captured scene by combining the first preview frame and second preview frame from the primary and the secondary camera respectively.

The memory 204 may be implemented as at least one of a volatile memory (e.g., a dynamic RAM (DRAM), a static RAM (SRAM), or a synchronous dynamic RAM (SDRAM), etc.) or a non-volatile memory (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash, etc.), a hard drive, or a solid state drive (SSD)). In the case of a memory that can be attached to or detached from the electronic apparatus 100, the memory may be implemented as forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The user can focus the scene using the primary camera 216 of the electronic device 102 and may capture the first preview frame of the media. The processor 206 can be configured to analyze whether the captured first preview frame is of a low light scene based on at least one pre-defined parameter. The processor 206, on determining that the first preview frame has captured a low light scene, can trigger the secondary camera to capture the second preview frame. Processor 206 can configure the secondary camera with a higher exposure time, which can be used to obtain the secondary preview frame. The processor 206 may be configured to generate the output frame by combining the first preview frame and the secondary preview frame using the AI model based on at least one pre-defined parameter to enhance the low light scene.

The processor 206 may identify whether at least one scene of a captured at least one first preview frame of at least one primary camera 216 is in low light based on at least one pre-defined parameter of the at least one first preview frame.

Upon determining that the at least one first preview frame is in low light, the processor 206 may trigger at least one secondary camera 218 for one of higher field of view (FOV) and same field of view (FOV) of the at least one primary camera 216.

The processor 206 may configure at least one secondary camera 218 with a higher exposure time to obtain at least one secondary preview frame.

The processor 206 may generate at least one output frame from the at least one first preview frame and the at least one secondary preview frame based on at least one pre-defined parameter.

The processor 206 may generate at least one output frame by performing a comparison between a histogram of the at least one first preview frame and the at least one secondary preview frame corresponding to the at least one pre-defined parameter.

The processor 206 may perform histogram equalization to generate at least one output frame by combining the at least one first preview frame and at least one second preview frame using an artificial intelligence (AI) module to accurately reproduce at least one color of an object captured in at least one scene.

The AI module may generate the at least one output frame to enhance brightness and to reduce noise of at least one captured region of the object in at least one scene.

The media processor 208 may analyze whether at least one scene of a captured at least one first preview frame of at least one primary camera 216 is in low light based on at least one pre-defined parameter of the at least one first preview frame.

Upon determining that the at least one first preview frame is in low light, the media processor 208 may trigger at least one secondary camera 218 for one of higher field of view (FOV) and same field of view (FOV) of the at least one primary camera 216.

The media processor 208 may configure at least one secondary camera 218 with a higher exposure time to obtain at least one secondary preview frame.

The media processor 208 may generate at least one output frame from the at least one first preview frame and the at least one secondary preview frame based on at least one pre-defined parameter.

The media processor 208 may generate at least one output frame by performing a comparison between a histogram of the at least one first preview frame and the at least one secondary preview frame corresponding to the at least one pre-defined parameter.

The media processor 208 may perform histogram equalization to generate at least one output frame by combining the at least one first preview frame and at least one second preview frame using an artificial intelligence (AI) module to accurately reproduce at least one color of an object captured in at least one scene.

The media processor 208 of the electronic device 102 can be the processing unit referred to herein also as an image signal processor (ISP) configured with a primary camera and a secondary camera. Therefore, each of the ISPs connected to the primary and secondary cameras can be connected to an enhancing unit, which enhances the captured scene by combining the primary and secondary preview frames. The ISP of the primary camera, on analyzing that the first preview frame has captured a low light scene, can trigger the secondary camera to capture secondary preview frame. The media processor 208 may include the image signal processor (ISP). The processor 206 may include the media processor 208. The processor 206 may include the image signal processor (ISP).

The enhancing unit of the media processor 208 can be configured to combine both the first and secondary preview frames to obtain the output frame based on at least one pre-determined parameter. The output frame can be generated by comparing the histogram equalization of the first preview frame and the second preview frame. The output frame can be obtained by fusing the secondary frame with the output of the AI model to accurately reproduce colors of the objects in the scene, brightness at certain regions and reduce noise in the enhanced output frame. Histogram equalization can be performed by the enhancing unit by processing the primary and secondary preview frame by adjusting an image's histogram by increasing contrast of captured images by increasing the intensity of the images. Therefore, intensities can be distributed on the histogram utilizing the entire range of intensities evenly on the images. The output of the AI model can be obtained with frame map of the primary enhanced frame and boosts the overall brightness of the primary preview frame. AI model can be configured to fuse the secondary higher exposure frame with the frame map using pixel wise weighted average based on luminance and exposure gain of the primary camera.

The output unit 210 may include at least one of, for example, a display, a User Interface (UI) module, a light-emitting device, and so on, to display the enhanced frames from the captured scene, but the disclosure is not limited thereto. The UI module may provide a specialized UI or graphical user interface (GUI), or the like, synchronized to the electronic device 102, according to the applications.

Figure 3:
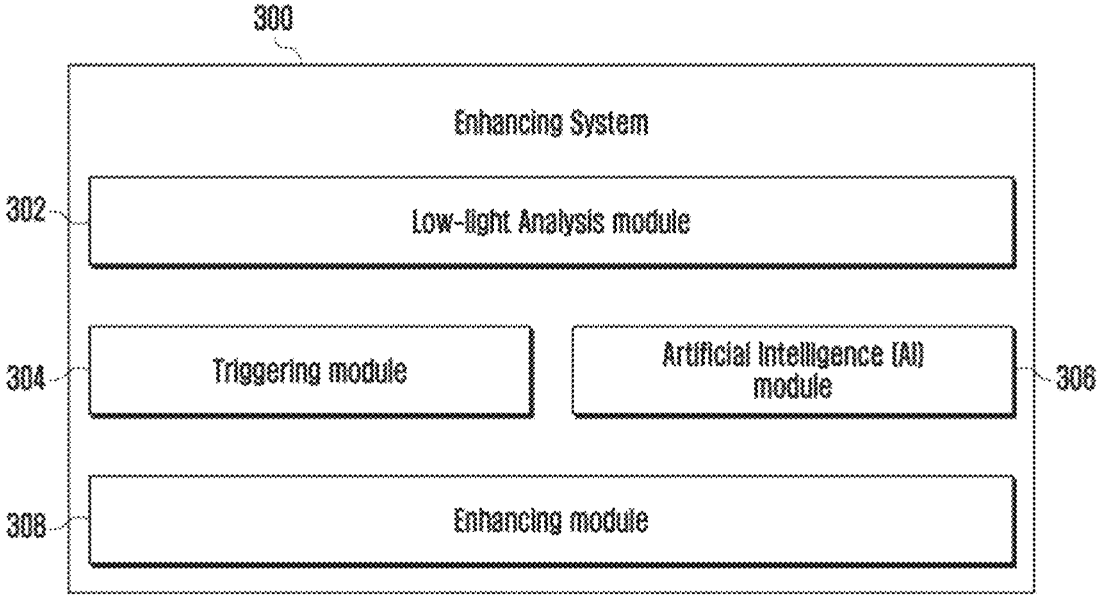
FIG. 3 depicts a block diagram illustrating various modules of a system for enhancing the frame of the captured media in the electronic device, according to one or more embodiments of the disclosure.

FIG. 3 depicts a block diagram illustrating various modules of a system for enhancing the frame of the captured media in the electronic device, according to one or more embodiments of the disclosure. Enhancing system 300 comprises a low-light analysis module 302, a triggering module 304, an artificial intelligence (AI) module 306 and an enhancing module 308. The processor 206 may include the low-light analysis module 302, the triggering module 304, the artificial intelligence (AI) module 306 and the enhancing module 308.

The low-light analysis module 302 may analyze the low-light conditions of the captured first preview frame using the primary camera based on at least one pre-defined parameter. The pre-defined parameter(s) can be used to determine if the captured scene/media has captured a low light scene. The at least one pre-defined parameter of the captured scene may include but not limited to the primary camera's/sensor's luminance value, International Organization for Standardization (ISO), exposure gain and the like. The luminance value of the primary camera may refer to an exposure value that measures the luminous intensity per unit area of light travelling in a given direction. ISO may refer to camera settings which can be used to brighten or darken the scene while capturing the media.

The processor 206 may analyze the low-light conditions of the captured first preview frame using the primary camera based on at least one pre-defined parameter. The pre-defined parameter(s) can be used to determine if the captured scene/media has captured a low light scene. The at least one pre-defined parameter of the captured scene may include but are not limited to the primary camera's/sensor's luminance value, International Organization for Standardization (ISO), exposure gain and the like. The luminance value of the primary camera may refer to an exposure value that measures the luminous intensity per unit area of light travelling in a given direction. ISO may refer to camera settings which can be used to brighten or darken the scene while capturing the media.

The triggering module 304 can be configured to trigger the secondary camera. In an embodiment herein, the secondary camera can be triggered to capture frames with a larger Field of View (FOV), as compared to the first preview frame. The larger FOV allows the secondary camera to capture more efficient images containing more scenes to capture the entire frame. In an embodiment herein, the secondary camera can be triggered to capture frames with a smaller Field of View (FOV), as compared to the first preview frame. In an embodiment herein, the secondary camera can be triggered to capture frames with the same FOV.

The processor 206 can be configured to trigger the secondary camera. In an embodiment herein, the secondary camera can be triggered to capture frames with a larger Field of View (FOV), as compared to the first preview frame. The larger FOV allows the secondary camera to capture more efficient images containing more scenes to capture the entire frame. In an embodiment herein, the secondary camera can be triggered to capture frames with a smaller Field of View (FOV), as compared to the first preview frame. In an embodiment herein, the secondary camera can be triggered to capture frames with the same FOV.

The Artificial Intelligence (AI) module 306 can be configured to enhance the low-light frame of the captured scene. In an embodiment herein, the secondary camera image can be obtained at a higher exposure time compared to primary camera (not using the same exposure time). The contrast of the primary camera frame can be enhanced using the secondary camera frame using histogram equalization.

The processor 206 can be configured to enhance the low-light frame of the captured scene. In an embodiment herein, the secondary camera image can be obtained at a higher exposure time compared to primary camera (not using the same exposure time). The contrast of the primary camera frame can be enhanced using the secondary camera frame using histogram equalization.

The enhanced primary preview frame, along with exposure gain an value, can be passed to the AI module 306 to boost the brightness of the captured scene to obtain a smaller resolution map. The map is fused (average blending based on at least one primary camera parameter) with the secondary frame to obtain an accurately bright, less noisy & colorful image.

The enhanced primary preview frame, along with the exposure gain value, can be passed to the processor 206 to boost the brightness of the captured scene to obtain a smaller resolution map. The map is fused (average blending based on at least one primary camera parameter) with the secondary frame to obtain an accurately bright, less noisy & colorful image.

The enhancing module 308 may be configured to generate the output frame from the captured first preview frame and secondary preview frame based on at least one pre-defined parameter. The electronic device 102 may provide the out-frame by combining first and second preview frames based on AI related model to enhance the low light frame captured in a media.

The processor 206 may be configured to generate the output frame from the captured first preview frame and secondary preview frame based on at least one pre-defined parameter. The electronic device 102 may provide the out-frame by combining first and second preview frame based on AI related model to enhance the low light frame captured in a media.

Examples of the neural network implemented in the enhancing module 308 may be, but are not limited to, an Artificial Intelligence (AI) model, a multi-class Support Vector Machine (SVM) model, a Convolutional Neural Network (CNN) model, a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression-based neural network, a deep reinforcement model (with ReLU activation), a deep Q-network, and so on. The neural network may include a plurality of nodes, which may be arranged in layers. Examples of the layers may be but are not limited to, a convolutional layer, an activation layer, an average pool layer, a max pool layer, a concatenated layer, a dropout layer, a fully connected layer, a SoftMax layer, and so on. Each layer has a plurality of weight values and performs a layer operation through calculation of a previous layer and an operation of a plurality of weights/coefficients. A topology of the layers of the neural network may vary based on the type of the respective network. In an example, the neural network may include an input layer, an output layer, and a hidden layer. The input layer receives a layer input and forwards the received layer input to the hidden layer. The hidden layer transforms the layer input received from the input layer into a representation, which may be used for generating the output in the output layer. The hidden layers extract useful/low-level features from the input, introduce non-linearity in the network and reduce a feature dimension to make the features equivalent to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

The enhancing module 308 may be trained using at least one learning method. Examples of the learning method may be, but are not limited to, supervised learning, unsupervised learning, semi-supervised learning, reinforcement learning, regression-based learning, and so on. The enhancing module 308 may use neural network models in which several layers, a sequence for processing the layers, and parameters related to each layer may be known and fixed for performing the intended functions. Examples of the parameters related to each layer may be, but are not limited to, activation functions, biases, input weights, output weights, and so on, related to the layers. A function associated with the learning method may be performed through the non-volatile memory, the volatile memory, and/or the processor 206. The processor 206 may include one or a plurality of processors. One or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

Here, being provided through learning means that, by applying the learning method to a plurality of learning data, a predefined operating rule, or the neural network, the enhancing module 308 of the desired characteristic is made. Functions of the neural network implemented in enhancing module 308 may be performed in the electronic device 102 itself in which the learning according to an embodiment is performed, and/or maybe implemented through a separate server/system.

Figure 4:
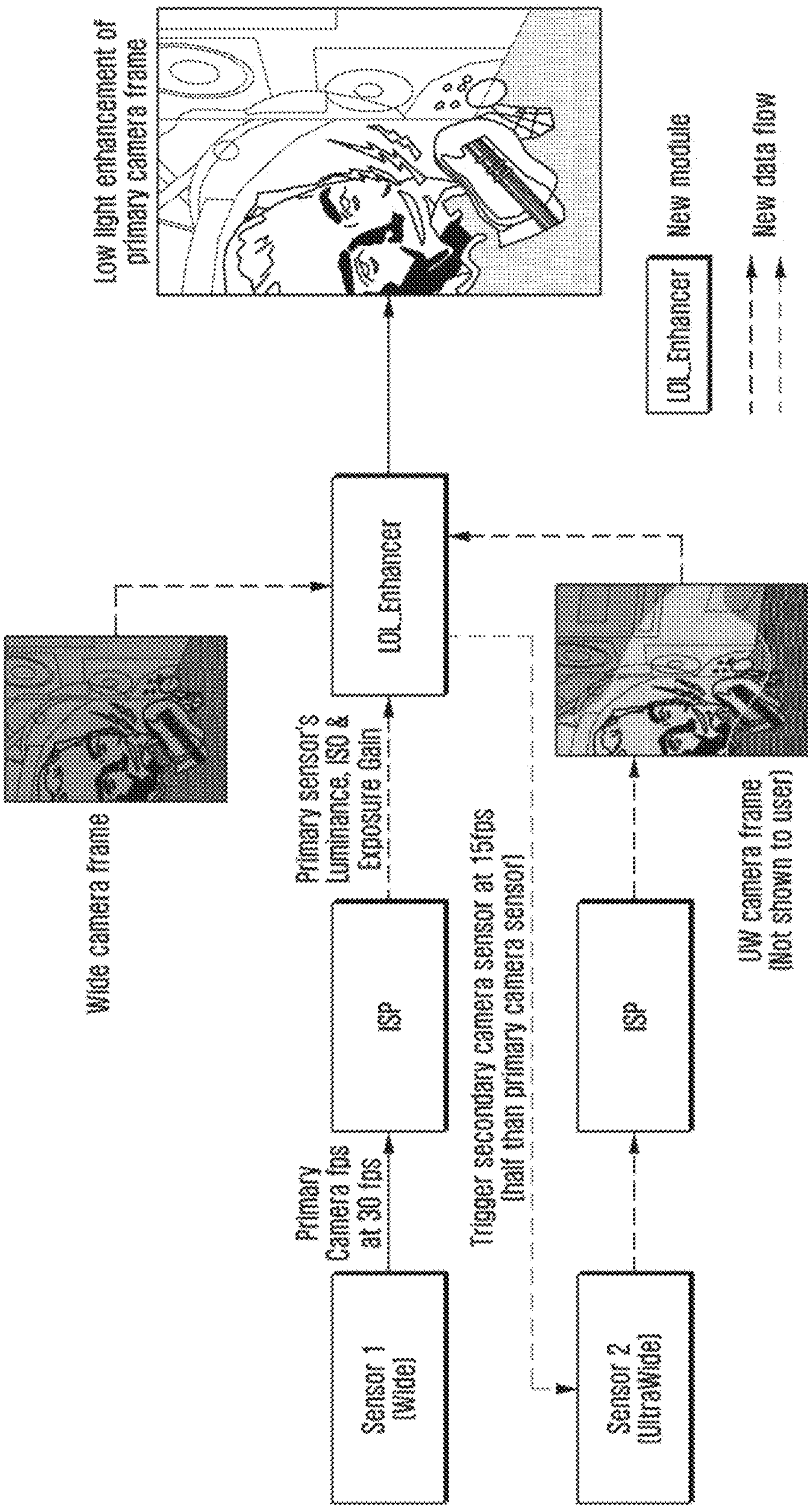
FIG. 4 depicts an example scenario, wherein a media processor enhances the low light image from the captured media of the electronic device, according to one or more embodiments of the disclosure.

FIG. 4 depicts an example scenario, wherein a media processor 208 can enhance the low light scenario from the captured media of the electronic device 102, according to one or more embodiments of the disclosure. As illustrated in FIG. 4, the primary camera 216 may capture the primary first frame of the scene, and the ISP may receive the captured scene and analyze the frames of the scene based on at least one pre-defined parameter. In an embodiment, the ISP of the primary camera 216, on receiving the scene with a frame rate of 30 frames per second (fps), may analyze the captured first preview frame with respect to pre-defined parameter(s). The pre-defined parameter(s) may include but are not limited to luminance value, exposure gain, ISO value and the like. The luminance value corresponds to the brightness of the captured scene. ISO value corresponds to the sensitivity of the scene and exposure gain corresponds to the contrast rate of the captured scene. The enhancing unit of the media processor 208, on identifying that the captured first preview frame has captured a low light scene, may trigger the secondary camera 218 (based on at least one pre-defined parameter). In an embodiment herein, the primary camera 216 can be a wide sensor camera and the secondary camera 218 can be an ultrawide sensor camera.

The electronic device 102, on determining that the first preview frame has captured a low light scene, may trigger the secondary camera 218. In an embodiment herein, the secondary camera 218 may be triggered to capture frames with a larger Field of View (FOV), as compared to the first preview frame. The larger FOV allows the secondary camera 218 to capture more efficient images containing more scenes to capture the entire frame. In an embodiment herein, the secondary camera 218 may be triggered to capture frames with a smaller Field of View (FOV), as compared to the first preview frame. In an embodiment herein, the secondary camera 218 may be triggered to capture frames with the same FOV.

The secondary camera 218 may be configured with a higher exposure time to obtain at least one secondary preview frame of the scene. The secondary preview frame can comprise more details. The electronic device 102 may generate an output frame from the captured first preview frame and secondary preview frame based on at least one pre-defined parameter. The electronic device 102 may provide the output frame by combining the first and second preview frames based on an AI model to enhance the low light frame captured in a media.

The electronic device 102 may be configured with a plurality of cameras, wherein a first camera used to capture the first preview frame is referred to herein as the primary camera 216 and a second camera used to capture the secondary frame is referred to herein as the secondary camera 218. The electronic device 102 referred to herein may be configured to capture and combine the preview frames to enhance the low light scenes from the media.

The exposure time referred to herein may be a length of time that the camera collects light from the scene with the increased brightness, resolution, and the like. In an embodiment, the secondary camera 218 may be triggered at 15 frames per second (fps) which is half the frame rate of the primary camera 216. The ISP of the secondary camera 218 may be configured with higher exposure time, with two times or three times of the primary camera 216 to capture the scene. The enhancing unit can be configured to generate the output frame by comparing the histogram of the first and second preview frame with respect to the at least one pre-defined parameter. The "primary camera" referred to herein may be used interchangeably with terms such as, "sensor 1", "primary sensor" and "secondary camera" may be used interchangeably with terms such as, "sensor 2", "secondary camera" and the like.

Figure 5A:
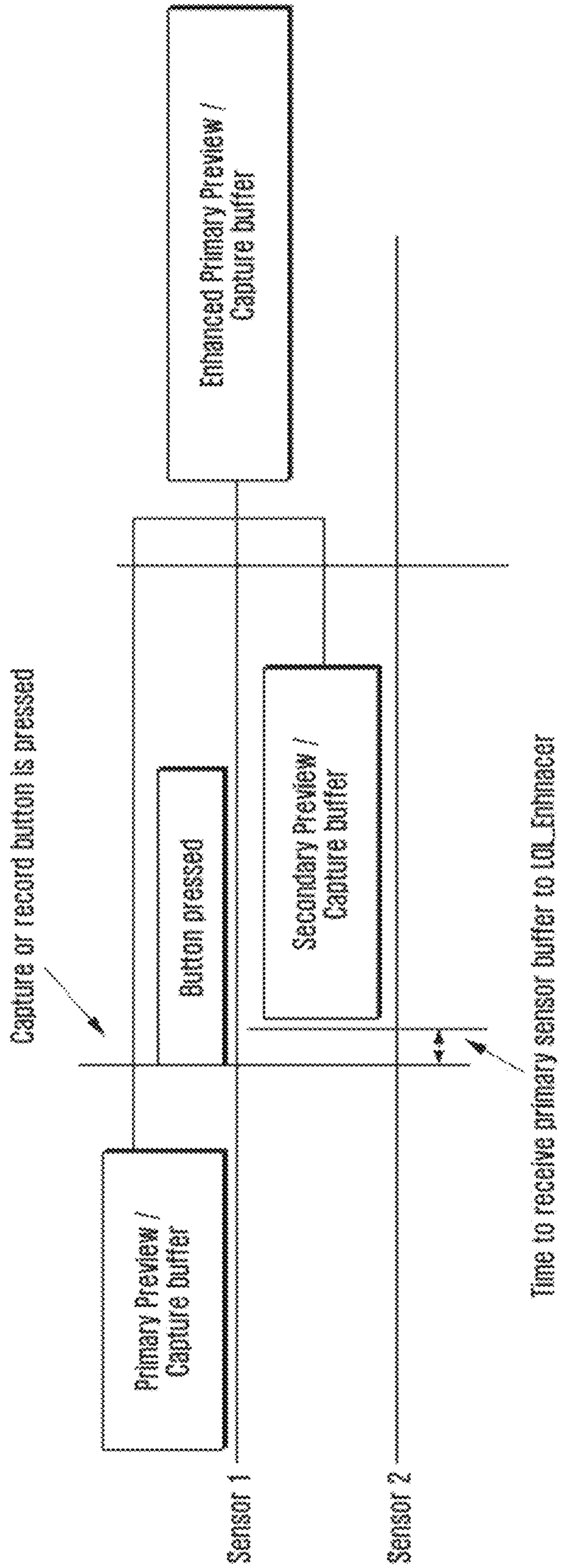
FIGS. 5A and 5B are example timing diagrams illustrating time to trigger secondary camera for higher field of view (FOV), according to one or more embodiments of the disclosure.
Figure 5B:
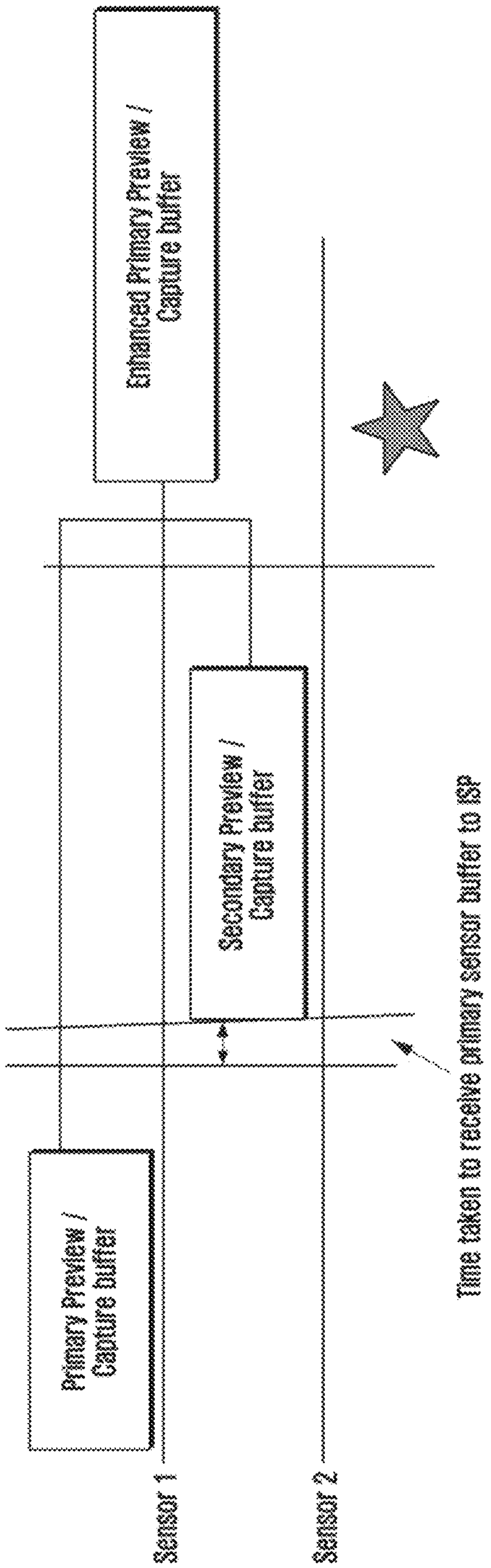

FIGS. 5A and 5B are example timing diagrams illustrating time to trigger secondary camera 218 for higher field of view (FOV), according to one or more embodiments of the disclosure. As illustrated in FIG. 5A, the primary camera 216/primary sensor can be used to focus on the scene, and the user while capturing the scene may enable the capture button. The enhancing unit, on analyzing the scene based on at least one pre-defined parameter, may trigger the secondary camera 218 to capture the scene with higher exposure time. The primary camera 216 and the secondary camera 218 may be configured with the preview and capturing buffer. Time to enable enhancing unit of the media processor 208 by the primary camera 216/primary sensor, which may trigger the secondary camera 218 may be illustrated in the FIG. 5A. In an embodiment, the secondary camera 218 may be triggered by the enhancing unit of the media processor 208 through manually (user on enabling the capture or record button of the electronic device 102).

As illustrated in FIG. 5B, the secondary camera 218 may be triggered automatically by the ISP of the primary camera 216 without any human intervention. The primary camera 216/primary sensor may be used by the user to focus the scene. The enhancing unit of the media processor 208 may automatically trigger the secondary camera 218 to capture the scene with higher exposure time. Triggering the secondary camera 218 may be automatically performed based on the user selection mode to capture the scene.

In another embodiment, the user may enable automatic capture mode of the scene, particularly in low light shot to capture the scene. During the automatic trigger mode, an exposure time of the secondary camera 218 will be three times more than an exposure time of the primary camera 216. Time to perform automatic triggering of the secondary camera 218 by the primary camera 216/primary sensor, may be illustrated in the FIG. 5B. ISP of the primary camera 216 may be configured to trigger the secondary camera 218 in an automatic mode. Triggering secondary camera will be automatic if the ISP of the primary camera 216 analyses the following conditions which may include, but not limited to luminance value less than 2 cd/m$^2$, identified ISO value less than 1000 and autofocus of the primary camera fails continuously for more than two times in 5 seconds duration and the like.

Figure 6:
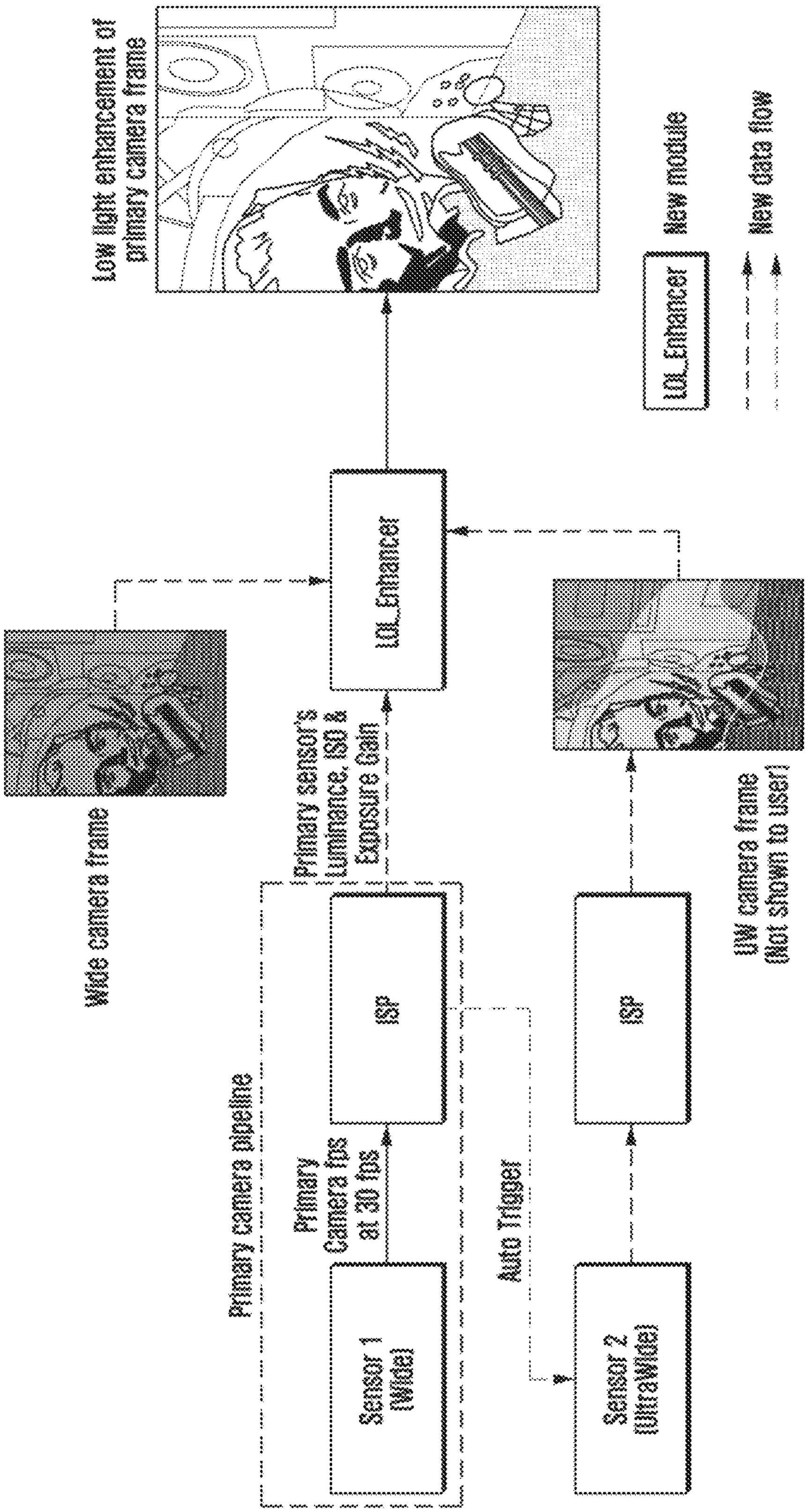
FIG. 6 is an example diagram illustrating triggering of a secondary camera by an ISP of a primary camera for enhancing the frame of the captured media, according to one or more embodiments of the disclosure.

FIG. 6 is an example diagram illustrating triggering of secondary camera 218 by an ISP of a primary camera 216 for enhancing the frame of the captured media, according to one or more embodiments of the disclosure. As illustrated in FIG. 6, the user on enabling automatic capture mode can capture the scene without any human intervention. As illustrated in FIG. 6, the user may use primary camera 216/primary sensor to focus the scene, the ISP of the primary camera 216 may analyze the scene based on at least one pre-determined parameter. The ISP on identifying that the captured scene is in low light condition, may trigger the secondary camera 218 to capture the scene with enhancements. The secondary camera 218 may be auto triggered to capture the scene with higher exposure time. ISP of the secondary camera 218 may be configured to capture the scene with higher exposure time when compared to primary camera 216. The enhancing unit of the media processor 208 may enhance the captured scene from the secondary camera 218 using the AI model, which involves histogram equalization of the captured scene from the secondary camera.

In an embodiment, the primary camera 216/primary sensor may be a wide camera focusing first preview frame at 30 frames per second (fps). ISP of the primary camera 216 may analyze the scene based on at least one pre-defined parameter such as luminance, ISO and exposure gain, may trigger the secondary camera which may be a ultrawide sensor. The ultrawide camera/sensor may support an angle of view greater than 90 degrees, which provides a wider view compared to the primary camera 216. Auto triggering the secondary camera 218 may capture the scene with more exposure time. The enhancing unit of the media processor 208 may combine the captured scenes from the primary camera 216 and secondary camera 218 to enhance the captured scene. The enhancing unit of the media processor 208 on receiving the captured scenes may perform histogram equalization by AI model to enhance the captured scene in the low light scenario.

In another embodiment, low light enhancement of the scene can be performed using primary and secondary cameras by obtaining frames at different exposure settings. Triggering the secondary camera 218 at lower fps compared to the primary camera 216 may be based on at least one pre-defined parameter which may include but not limited to luminance, ISO and exposure gain settings. Frame enhancements may be performed through histogram equalization by combining the secondary frame with the output of the AI model to reproduce the colors of the object in the scene, enhancing the brightness at regions and by reducing the noise in the enhanced output frame.

Figure 7:
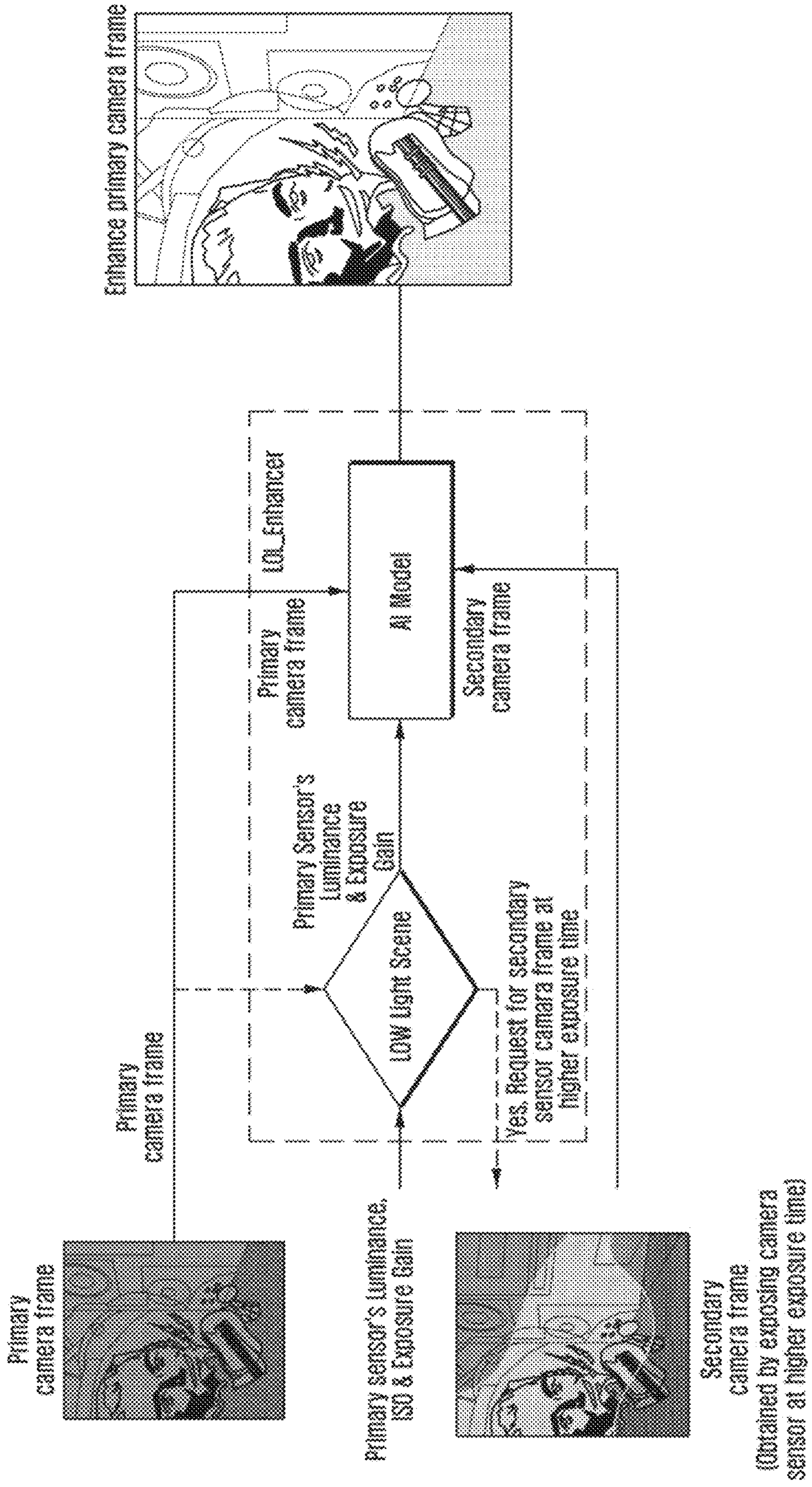
FIG. 7 is an example diagram illustrating an artificial intelligent (AI) model of the media processor and/or the processor for enhancing the frame of the captured media, according to one or more embodiments of the disclosure.

FIG. 7 is an example diagram illustrating an artificial intelligent (AI) model of the media processor 208 and/or the processor 206 for enhancing the frame of the captured media, according to one or more embodiments of the disclosure. As illustrated in FIG. 7, the scene captured by the primary camera 216 may be analyzed by the enhancing unit to determine whether the scene is a low light scene based on at least one pre-defined parameter. Based on identifying that the scene has captured a low light scene, the enhancing unit of the media processor 208 may trigger the secondary camera to capture the scene at higher exposure time.

In an embodiment, the primary camera 216, on capturing the scene at low light or not based on the input frame i.e., the camera is exposed at 30 ms and values of the at least one pre-defined parameter such as luminance, ISO and exposure gain values indicate that the captured scene is a low light scene. The enhancing unit of the media processor 208, on identifying that the scene is a low light scene, may cause the secondary camera to be triggered at a higher exposure time than the exposure time of the primary camera (i.e., the camera is exposed at 60 ms or 90 ms). The secondary camera 218 may be configured to be exposed for a longer duration with less noise. Hence, the captured low light frame of the primary camera 216, the captured secondary frame of the secondary camera 218, and the luminance value, ISO value and exposure gain value can be provided to the AI model for frame enhancement.

Figure 8:
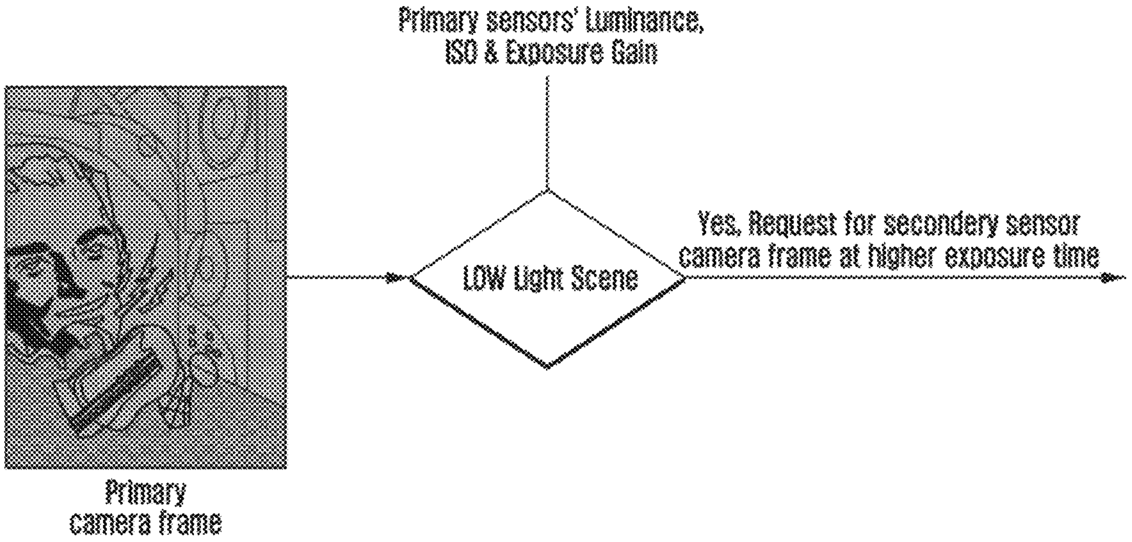
FIG. 8 is an example diagram illustrating the primary camera checking the low light scenario based on at least one pre-defined parameter of the captured frame, according to one or more embodiments of the disclosure.

FIG. 8 is an example diagram illustrating the primary camera 216 checking the low light scenario based on at least one pre-defined parameter of the captured frame, according to one or more embodiments of the disclosure. The enhancing unit of the media processor 208 may identify the captured scene is in a low light condition based on the following values such as the luminance value is in the range of 2 cd/m$^2$ to 5 cd/m$^2$s, ISO value set for the primary camera is in the range of 1000 to 32000, exposure gain value set for primary camera is in range of 800-1000. Exposure gain is the value to adjust the brightness of the capturing frame based on the current light conditions of the camera exposed to the scene. In another embodiment, if the luminance value is less than 2 cd/m$^2$, the ISO value is greater than 3200 and the exposure gain value is greater than 1000, the image can be considered as being in a low light condition. Also, if values of the at least one pre-defined parameter are not in the above-mentioned range, the captured scene cannot be considered as a low light scene, and thus the secondary camera 218 need not be triggered and the primary camera frame need not be enhanced.

Figure 9:
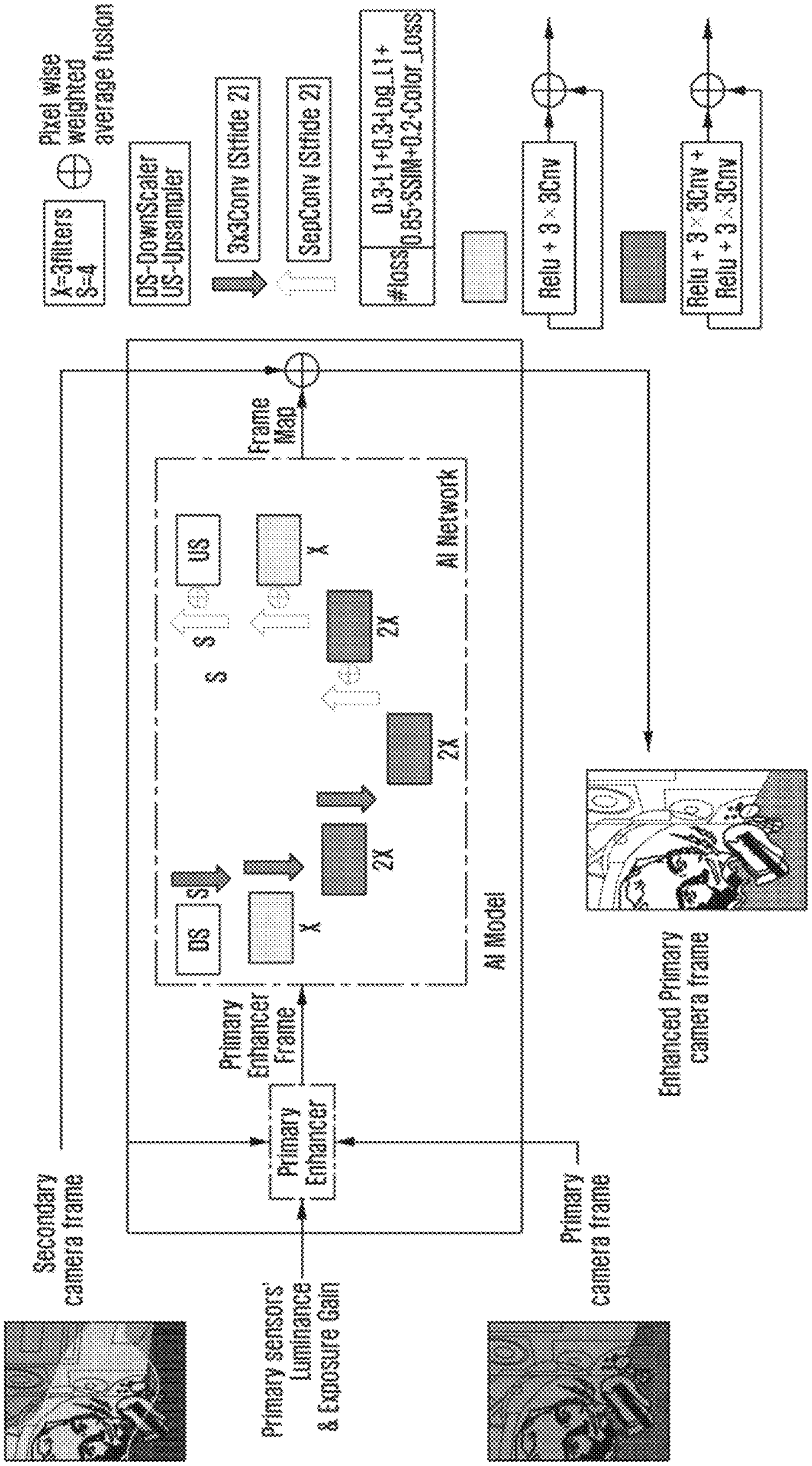
FIGS. 9 and 10 are example diagrams illustrating the AI model of the media processor and/or the processor for enhancing the frame of the captured media, according to one or more embodiments of the disclosure.
Figure 10:
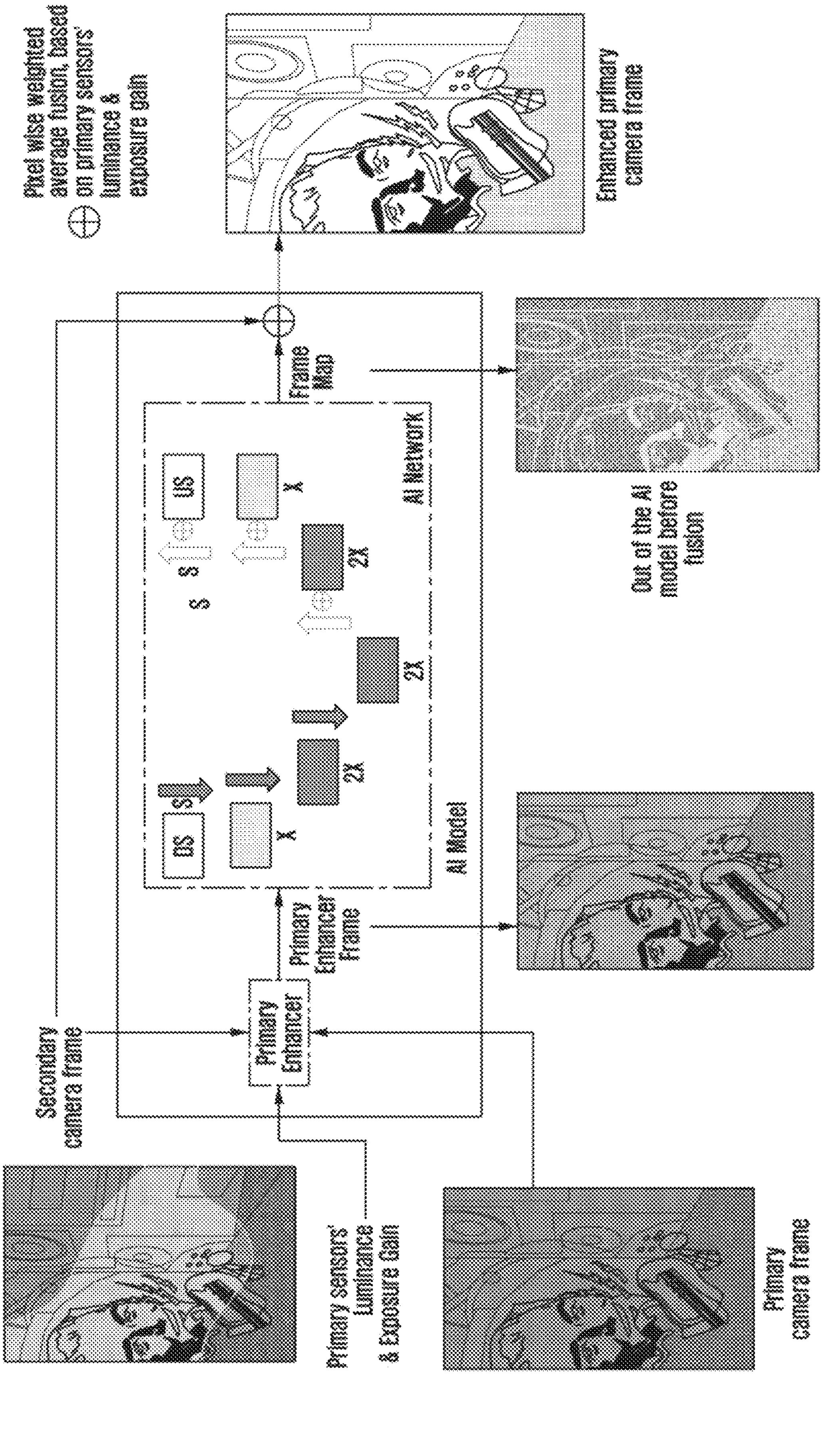

FIGS. 9 and 10 are example diagrams illustrating the AI model of the media processor 208 and/or the processor 206 for enhancing the frame of the captured media, according to one or more embodiments of the disclosure. As illustrated in FIG. 9, the enhancing unit of the media processor 208 includes AI model and a primary enhancer. The primary enhancer, on receiving the primary camera frame, may analyze the at least one pre-defined parameter such as luminance, exposure gain and ISO. The primary camera frame can be enhanced by the AI model of the enhancing unit.

As illustrated in FIG. 9, the primary frame can be enhanced by performing a down scalar (DS) operation. DS deals with downscaling or disaggregation of the captured primary scene into smaller frames. The disaggregated frame is filtered by performing convolution which involves extraction of the key features on the smaller frames. Convolution is a process of transforming an image by applying kernel over each pixel and the neighboring pixel across the entire scene. Kernel referred to herein may be a matrix of values with size and values determining the transformation of the scene.

Further, the transformed frame can be filtered two times of the normal filtering with 3*3 matrix convolution with stride 2. Stride defines the step size of the kernel when traversing the image. The transformed frame may be filtered two time of the normal filtering with 3*3 matrix convolution. The transformed down scaled frames may be performed with up-sampling operation. Up-sampling deals with bringing back the resolution of the previous layer, using separable convolution of stride 2. Up-sampling may increase the resolution of the feature map obtained from the previous layer in the network by 2× times. The feature map may be generated by applying filters or feature detectors to the input image or the feature map output of the previous layers. Separable convolution referred to herein may deal with splitting the kernel into multiple steps. Separable convolution deals with splitting convolution operation into smaller kernels, for an instance the spatial separable convolution may perform splitting of spatial dimensions of an image and kernel, the width and the height. The up-sampling of the transformed frame may be performed at two time of the normal sampling with separable convolution. Further, the transformed frame may be performed at a normal sampling with separable convolution with three filters involved. Three filters involved may refer to three channels in the captured images, for example red, green and blue filters may be same as three kernels whose weights network can be trained.

Finally, the transformed frame by the AI model may be mapped based on the frames of the secondary camera frame with respect to pixel wise weighted average fusion. Pixel wise weighted average fusion may refer to replacing each pixel by a weighted average of its neighbors. Hence, fusion ensures that neighbor pixels contribute to the final output of the scene. The enhanced primary camera frame along with the fused secondary camera frame can be obtained from the AI model.

The primary enhancer of the enhancing unit may be configured to crop the secondary camera frame such that field of view (FOV) of the primary and secondary camera frames are at same extent. Primary enhancer may compute and equalize the histogram of both the frames of primary and cropped secondary frame to convert it into high contrast image. Histogram equalization may be used to improve contrast in images, it effectively spreads out the most frequent intensity values by stretching out the intensity range of the image to enhance the contrast.

Primary enhancer may also perform histogram matching, which involves the transformation of an image to match specified histogram. Also, histogram matching may be performed to normalize two images, when the images were acquired at the same illumination (such as shadows) over the same location, but by different cameras and the like.

AI network of AI model may be configured to obtain frame map from the primary enhanced frame and boosts the overall brightness of the scene. The frame map may be referred to the output that brightened image of lower resolution. The output of the AI model can be obtained with frame map of the primary enhanced frame and boosts the overall brightness of the primary preview frame. AI model can be configured to fuse the secondary higher exposure frame with the frame map using pixel wise weighted average based on luminance and exposure gain of the primary camera.

It may perform fusion (which involves pixel wise weighted average, based on primary camera's luminance and exposure gain) of the secondary higher exposure frame with the frame map.

As illustrated in FIG. 10, the frame during each stage of enhancements is shown. As illustrated, primary camera frame captured by the primary camera 216 is analyzed to be in low light condition based on parameters such as luminance and exposure gain of the primary camera 216. Primary enhanced frame as enhanced by the primary enhancer may be obtained. Output of the AI model before performing the fusion may be shown. Therefore, the enhanced primary frame with the fusion of secondary camera 218 may be obtained by frame mapping.

In another embodiment, pixel wise average blending can be performed with respect to luminance and exposure gain values of the primary camera 216. Enhancement can be performed when the luminance values is in the range of 2 $cd/m^2$ to 3 $cd/m^2$ and exposure gain value of the primary camera 216 is in the range of 800 to 900. Enhanced primary camera frame pixel=primary enhanced frame*0.4+secondary enhanced frame*0.6.

In an embodiment, the luminance value is in the range of 4 $cd/m^2$ to 5 $cd/m^2$ and exposure gain value of the primary camera is in the range of 900 to 1000. Enhanced primary camera frame pixel=primary enhanced frame*0.7+secondary enhanced frame*0.3.

In an embodiment, the luminance value is less than 2 $cd/m^2$ and exposure gain value is less than 800. Enhanced primary camera frame pixel=primary enhanced frame*0.9+secondary enhanced frame*0.1.

Figure 11A:
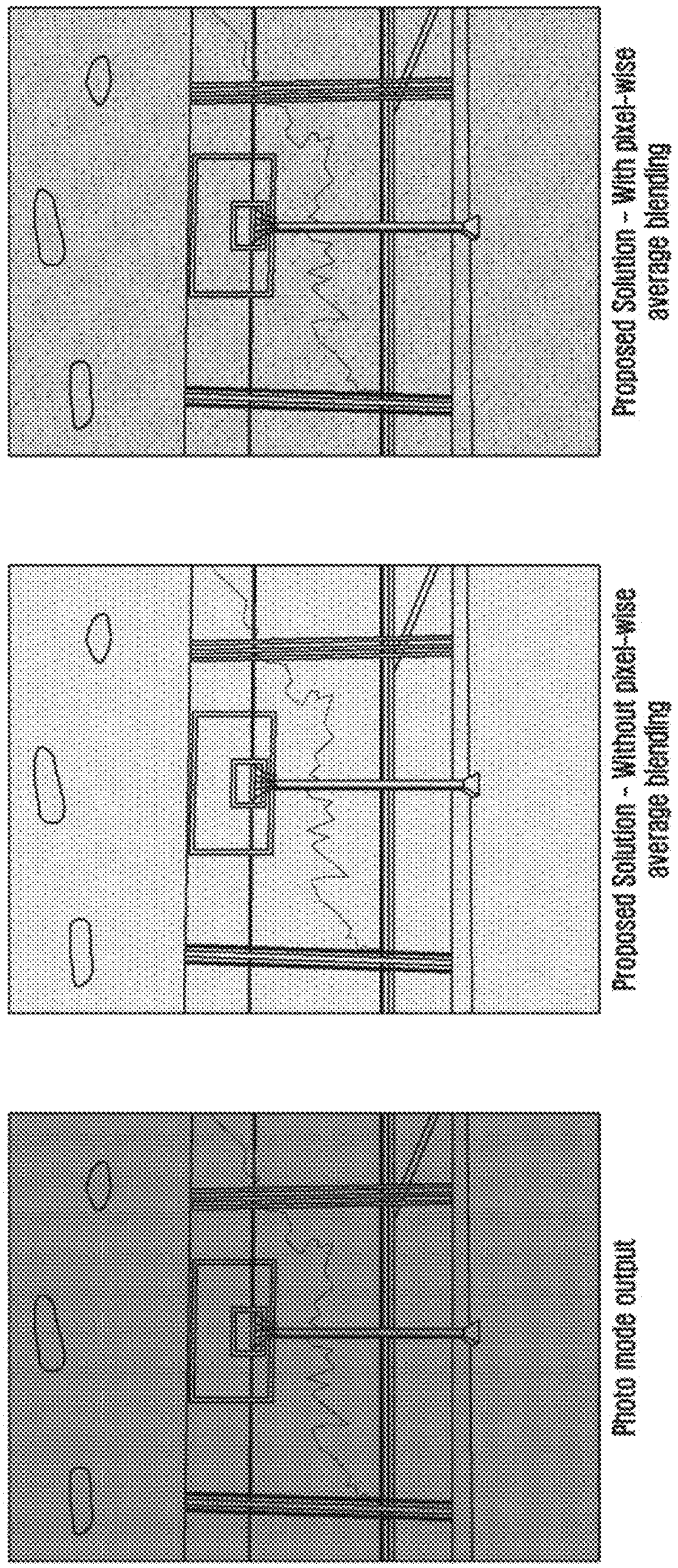
FIGS. 11A, 11B and 11C are example diagrams illustrating the enhanced frame of the captured media using pixel-wise blending, according to one or more embodiments of the disclosure.
Figure 11B:
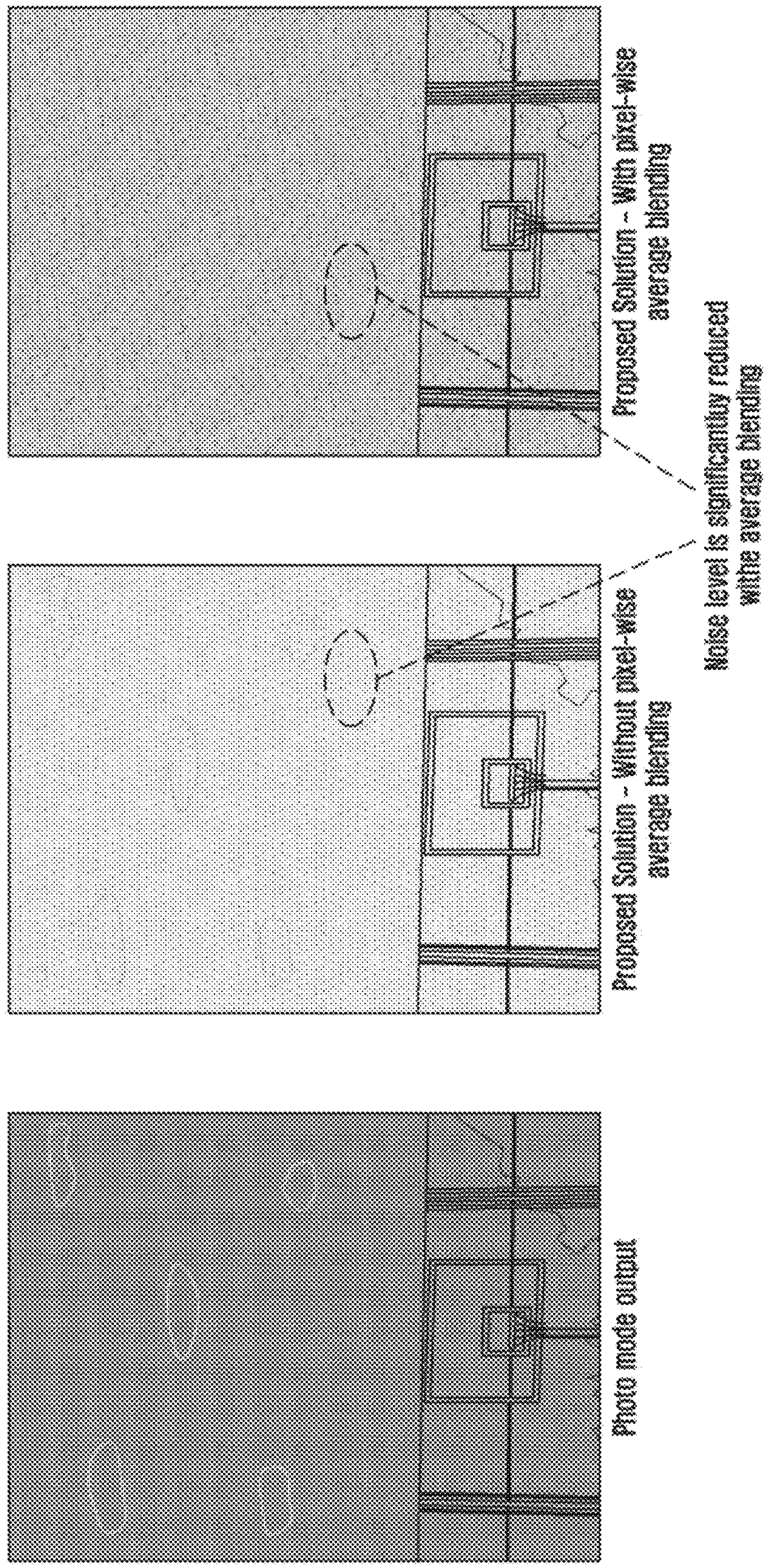
Figure 11C:
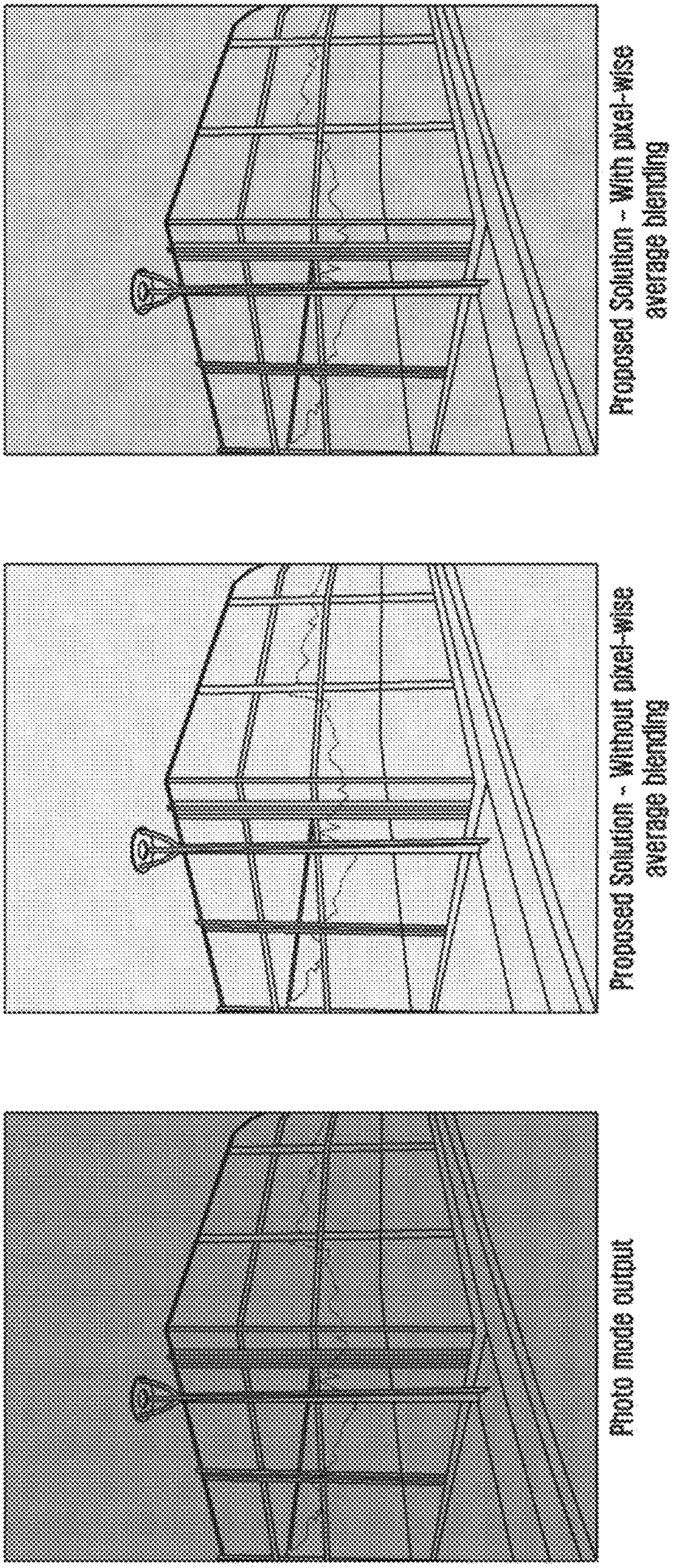

FIGS. 11A, 11B and 11C are example diagrams illustrating the enhanced frame of the captured media using pixel-wise blending, according to one or more embodiments of the disclosure. As illustrated in FIG. 11A, the scene captured in photo mode output, without pixel-wise average blending and with pixel wise average blending can be displayed. Similarly, in FIG. 11B and FIG. 11C, the scene captured in photo mode output, without pixel-wise average blending and with pixel wise average blending may be displayed with reduced noise level in pixel wise average blending and without pixel wise average blending.

Figure 12A:
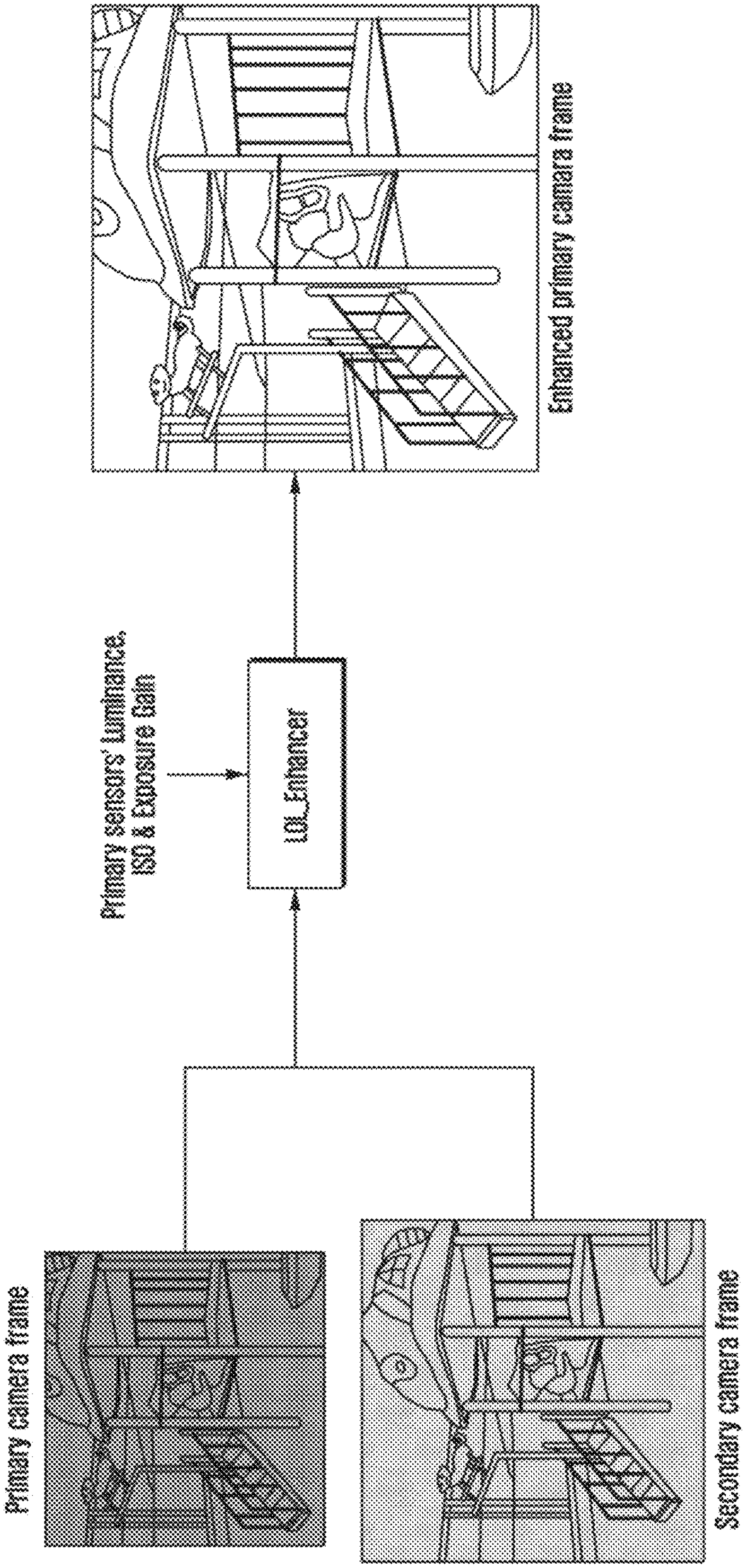
FIGS. 12A and 12B are example diagrams illustrating the enhanced frame of the captured media by the media processor and/or the processor based on at least one pre-defined parameter, according to one or more embodiments of the disclosure.
Figure 12B:
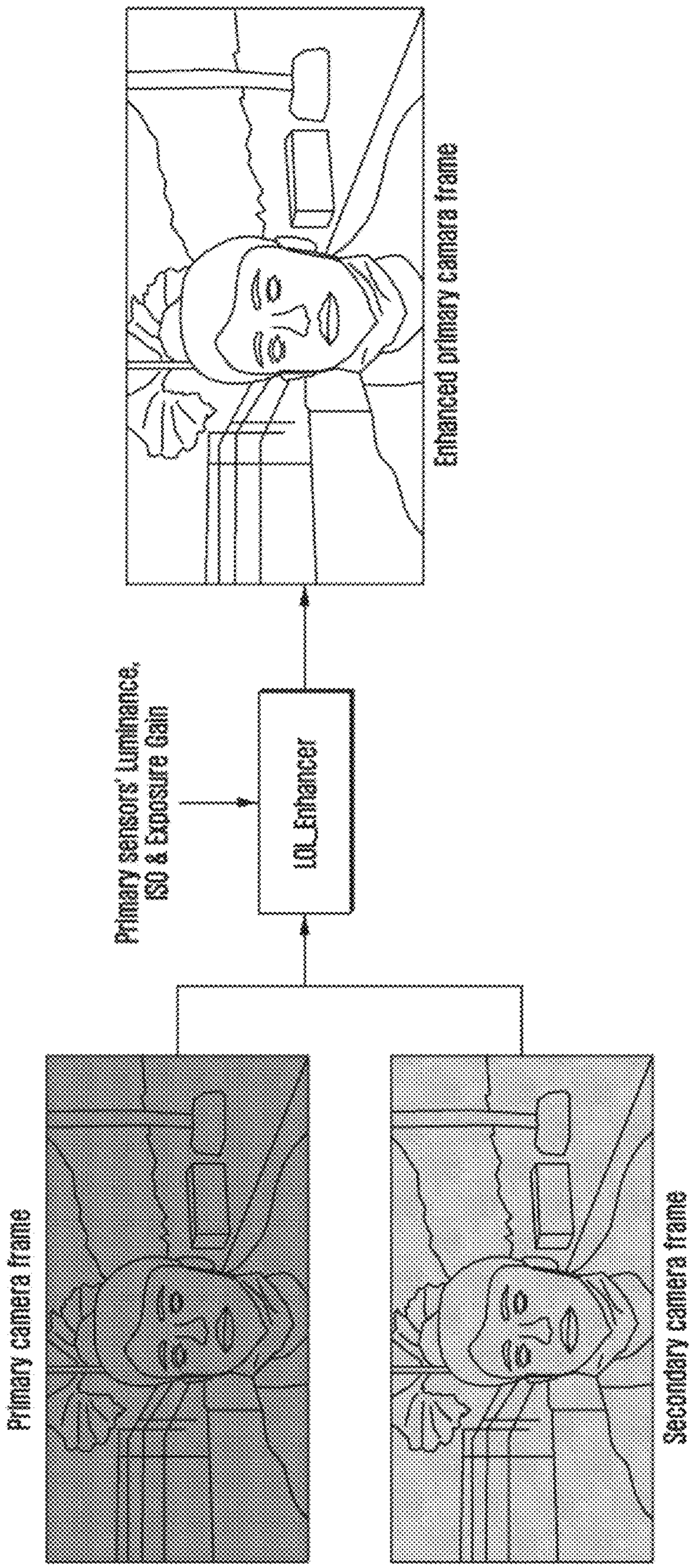

FIGS. 12A and 12B are example diagrams illustrating the enhanced frame of the captured media by the media processor 208 and/or the processor 206 based on at least one pre-defined parameter, according to embodiments as disclosed herein. As illustrated in FIG. 12A, the low light scenario captured in primary camera 216 may be enhanced by the enhancer by fusing the secondary camera frame may be illustrated. Therefore, enhancer may provide the final enhanced scene based on at least one pre-defined parameter.

As illustrated in FIG. 12B, the face tracking and focusing can be performed by the enhancer. The primary camera video captured by the primary sensor in low light condition may be analyzed by the enhancer. The secondary camera video may be captured to fuse the enhanced primary camera video to provide enhanced primary camera frame. As illustrated in FIG. 12B, the enhancer may be configured to track or focus the face captured by the primary and secondary camera to enhance the captured scene.

Figure 13:
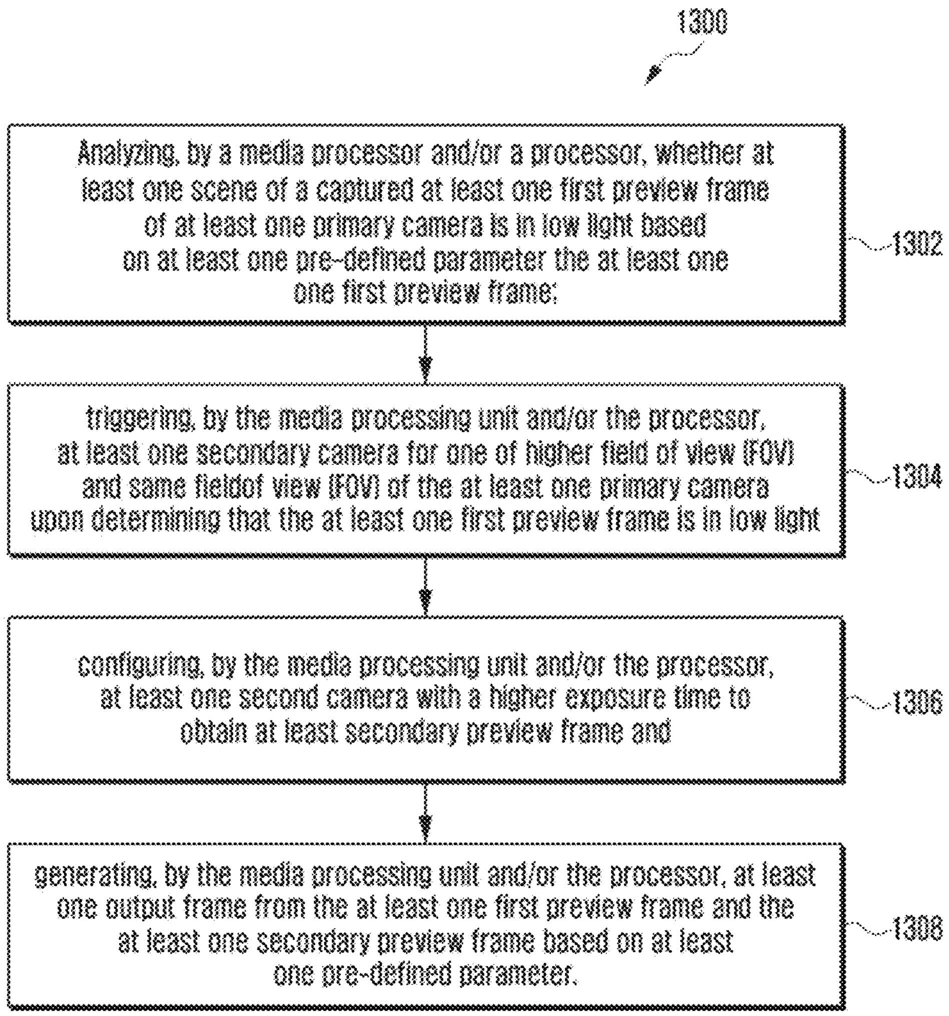
FIG. 13 is a flow diagram depicting a method for managing the user equipment in the wireless network, according to one or more embodiments of the disclosure.

FIG. 13 is a flow diagram depicting a method for managing the user equipment in the wireless network, according to one or more embodiments of the disclosure.

At operation 1302, the method includes analyzing, by the media processor 208 and/or the processor 206, whether at least one scene of a captured at least one first preview frame of at least one primary camera 216 is in low light based on at least one pre-defined parameter of the at least one first preview frame.

At operation 1304, the method includes triggering, by the media processor 208 and/or the processor 206, at least one secondary camera 218 for one of higher field of view (FOV) and same field of view (FOV) of the at least one primary camera 216, upon determining that the at least one first preview frame is in low light.

At operation 1306, the method includes configuring, by the media processor 208 and/or the processor 206, at least one secondary camera 218 with a higher exposure time to obtain at least one secondary preview frame.

At operation 1308, the method includes generating, by the media processor 208 and/or the processor 206, at least one output frame from the at least one first preview frame and the at least one secondary preview frame based on at least one pre-defined parameter.

The various actions, acts, blocks, steps, or the like in the method and the flow diagram 1300 may be performed in the order presented, in a different order or simultaneously. Further, in one or more embodiments, some of the actions, acts, blocks, steps, or the like may be omitted, added, modified, skipped, or the like without departing from the scope of the disclosure.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of one or more embodiments, those skilled in the art will recognize that the embodiments herein can be practiced with modification within the spirit and scope of the embodiments as described herein.

What is claimed is:

1. A method for enhancing media, the method comprising:

identifying whether a scene of a first preview frame captured by at least one primary camera was captured in low light based on at least one pre-defined parameter of the first preview frame;

based on identifying that the first preview frame was captured in low light, triggering at least one secondary camera to capture a second preview frame of the scene, wherein the second preview frame has an exposure time higher than an exposure time of the first preview frame, and wherein the second preview frame comprises one of a higher field of view (FOV) and a same FOV as compared to the first preview frame;

generating an enhanced first preview frame by performing a histogram equalization based on the first preview frame and the second preview frame;

obtaining a frame map for boosting brightness of the scene from the enhanced first preview frame using an artificial intelligence (AI) model; and generating an output frame by processing the second preview frame with the frame map using pixel wise weighted average.

2. The method of claim 1, wherein the at least one pre-defined parameter comprises one or more of a luminance value, an International Standard for Organization (ISO) value, and an exposure gain of the first preview frame.

3. The method of claim 1, wherein the generating the enhanced frame comprises comparing a first histogram of the first preview frame and a second histogram of the second preview frame, wherein the first and the second histograms correspond to the at least one pre-defined parameter.

4. The method of claim 1, further comprising:

based on identifying that the first preview frame does not fall within a predetermined range of the at least one pre-defined parameter, triggering the at least one secondary camera to capture the second preview frame.

5. The method of claim 1, further comprising:

based on a user selecting a specific acquisition mode to capture the scene, triggering the at least one secondary camera to capture the second preview frame.

6. The method of claim 1, wherein the generating the output frame further comprises:

performing the histogram equalization wherein the first preview frame and the second preview frame are combined using an artificial intelligence (AI) module to accurately reproduce a color of an object in the scene, and enhancing a brightness and reducing a noise of a region of the object in the scene using the AI module.

7. The method of claim 1, wherein the triggering the at least one secondary camera further comprises one of:

capturing at least one region of an object in the scene with the higher FOV; and capturing at least one region of the object with the same FOV.

8. An electronic device for enhancing media, the electronic device comprising:

at least one primary camera;

at least one secondary camera;

at least one memory storing one or more instructions; and at least one processor configured to execute the one or more instructions;

wherein the one or more instructions, when executed by the at least one processor, cause the electronic device to:

identify whether a scene of a first preview frame captured by the at least one primary camera was captured in low light based on at least one pre-defined parameter of the first preview frame, based on identifying that the first preview frame was captured in low light, trigger the at least one secondary camera to capture a second preview frame, wherein the second preview frame has an exposure time higher than an exposure time of the first preview frame, and wherein the second preview frame comprises one of a higher field of view (FOV) and a same FOV as compared to the first preview frame;

generate an enhanced first preview frame by performing a histogram equalization based on the first preview frame and the second preview frame;

obtain a frame map for boosting brightness of the scene from the enhanced first preview frame using an Artificial Intelligence (AI) model; and generate an output frame by processing the second preview frame with the frame map using pixel wise weighted average.

9. The electronic device of claim 8, wherein the at least one pre-defined parameter comprises one or more of a luminance value, an International Standard for Organization (ISO) value, and an exposure gain of the first preview frame.

10. The electronic device of claim 8, wherein the one or more instructions, when executed by the at least one processor, further cause the electronic device to:

generate the enhanced frame by comparing a first histogram of the first preview frame and a second histogram of the second preview frame, wherein the first and the second histograms correspond to the at least one pre-defined parameter.

11. The electronic device of claim 8, wherein the one or more instructions, when executed by the at least one processor, further cause the electronic device to:

based on identifying that the first preview frame does not fall within a predetermined range of the at least one pre-defined parameter, trigger the at least one secondary camera to capture the second preview frame, and based on a user selecting a specific acquisition mode to capture the scene, trigger the at least one secondary camera to capture the second preview frame.

12. The electronic device of claim 8, the one or more instructions, when executed by the at least one processor, further cause the electronic device to:

generate the output frame by performing the histogram equalization wherein the first preview frame and the second preview frame are combined using an artificial intelligence (AI) module to accurately reproduce a color of an object in the scene, and enhance a brightness and reduce a noise of a region of the object in the scene using the AI module.

13. The electronic device of claim 8, wherein the one or more instructions, when executed by the at least one processor, further cause the electronic device to:

trigger the at least one secondary camera to capture at least one region of an object in the scene with the higher FOV, or capture the at least one region of the object with the same FOV.

14. A non-transitory computer readable medium having instructions stored therein, which when executed by at least one processor cause the at least one processor to execute a method of enhancing media, the method comprising:

identifying whether a scene of a first preview frame captured by at least one primary camera was captured in low light based on at least one pre-defined parameter of the first preview frame;

based on identifying that the first preview frame was captured in low light, triggering at least one secondary camera to capture a second preview frame of the scene, wherein the second preview frame has an exposure time higher than an exposure time of the first preview frame, and wherein the second preview frame comprises one of a higher field of view (FOV) and a same FOV as compared to the first preview frame;

generating an enhanced first preview frame by performing a histogram equalization based on the first preview frame and the second preview frame;

obtaining a frame map for boosting brightness of the scene from the enhanced first preview frame using an Artificial Intelligence (AI) model; and generating an output frame by processing the second preview frame with the frame map using pixel wise weighted average.

15. The non-transitory computer readable medium of claim 14, wherein the at least one pre-defined parameter comprises one or more of a luminance value, an International Standard for Organization (ISO) value, and an exposure gain of the first preview frame.

16. The non-transitory computer readable medium of claim 14, wherein the generating the enhanced frame comprises comparing a first histogram of the first preview frame and a second histogram of the second preview frame, wherein the first and the second histograms correspond to the at least one pre-defined parameter.

17. The non-transitory computer readable medium of claim 14, wherein the method further comprises:

based on identifying that the first preview frame does not fall within a predetermined range of the at least one pre-defined parameter, triggering the at least one secondary camera to capture the second preview frame.

18. The non-transitory computer readable medium of claim 14, wherein the method further comprises:

based on a user selecting a specific acquisition mode to capture the scene, triggering the at least one secondary camera to capture the second preview frame.

19. The non-transitory computer readable medium of claim 14, wherein the generating the output frame further comprises:

performing the histogram equalization wherein the first preview frame and the second preview frame are combined using an artificial intelligence (AI) module to accurately reproduce a color of an object in the scene, and enhancing a brightness and reducing a noise of a region of the object in the scene using the AI module.

20. The non-transitory computer readable medium of claim 14, wherein the triggering the at least one secondary camera further comprises one of:

capturing at least one region of an object in the scene with the higher FOV; and capturing at least one region of the object with the same FOV.

* * * * *